United States Patent
Bishop

(10) Patent No.: US 8,943,071 B2
(45) Date of Patent: Jan. 27, 2015

(54) AUTOMATIC SORT AND PROPAGATION ASSOCIATED WITH ELECTRONIC DOCUMENTS

(75) Inventor: Michael Bishop, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 491 days.

(21) Appl. No.: 13/215,955

(22) Filed: Aug. 23, 2011

(65) Prior Publication Data

US 2013/0054613 A1 Feb. 28, 2013

(51) Int. Cl.
*G06F 17/30* (2006.01)

(52) U.S. Cl.
CPC ...... *G06F 17/30011* (2013.01); *G06F 17/3089* (2013.01)
USPC ............ 707/748; 707/737; 707/752; 707/754

(58) Field of Classification Search
USPC .................................. 707/737, 748, 752, 754
See application file for complete search history.

(56) References Cited

U.S. PATENT DOCUMENTS

| | | | |
|---|---|---|---|
| 6,012,090 A * | 1/2000 | Chung et al. | ........... 709/219 |
| 6,216,122 B1 | 4/2001 | Elson | |
| 6,226,630 B1 | 5/2001 | Billmers | |
| 6,243,724 B1 | 6/2001 | Mander et al. | |
| 6,314,421 B1 | 11/2001 | Sharnoff et al. | |
| 6,370,526 B1 | 4/2002 | Agrawal et al. | |
| 6,592,627 B1 | 7/2003 | Agrawal et al. | |
| 6,816,885 B1 | 11/2004 | Raghunandan | |
| 7,054,906 B2 | 5/2006 | Levosky | |
| 7,386,560 B2 * | 6/2008 | Tan | ............... 707/737 |
| 7,584,253 B2 | 9/2009 | Curbow et al. | |
| 7,596,594 B2 | 9/2009 | Karp | |
| 7,685,224 B2 * | 3/2010 | Nye | ............... 709/201 |
| 7,765,212 B2 | 7/2010 | Surendran et al. | |
| 7,769,144 B2 | 8/2010 | Yao et al. | |
| 7,822,738 B2 | 10/2010 | Andersen et al. | |
| 7,856,479 B2 | 12/2010 | Bellegarda et al. | |
| 2010/0094658 A1 * | 4/2010 | Mok et al. | .......... 705/3 |

* cited by examiner

*Primary Examiner* — Monica Pyo
(74) *Attorney, Agent, or Firm* — Amin, Turocy & Watson, LLP

(57) ABSTRACT

Techniques for automatic sort and propagation of information relating to electronic documents are presented. With regard to an electronic document, such as an incoming message, an enhanced information management component (EIMC) can analyze the document to identify a file folder associated with a subject to which the document relates. Based on interaction with or tagging of the document in a first user interface (UI) and predefined user preferences, the EIMC can propagate information relating to the subject and/or document to a second UI. The EIMC can archive the document in the identified file folder automatically or in response to as little as one UI control manipulation. The EIMC can analyze audio or video content to facilitate tagging and archiving of such content using the first UI and propagation of information relating to such content and/or related subject to a second UI.

20 Claims, 15 Drawing Sheets

AUTOMATIC SORT AND PROPAGATION ASSOCIATED WITH ELECTRONIC DOCUMENTS

TECHNICAL FIELD

The subject specification generally relates to electronic communication services, and, more particularly, to automatic sort and propagation associated with electronic documents.

BACKGROUND

Communication device users often use their communication devices (e.g., computer, mobile phone, electronic notepad, electronic netbook, etc.) to access information or electronic documents from web sites, email server, social network sites, content servers, etc., and to receive and send electronic documents, including messages (e.g., emails, text messages, multimedia messages) and associated content (e.g., audio or video content), and/or social network messages or postings. Some users (e.g., business persons, attorneys, legal assistants, etc.) often receive dozens to hundreds of electronic messages every day. Managing the high volume of electronic messages can be very time consuming for users. For instance, when a user receives an email regarding a particular business matter, the user can desire to save the email to an electronic file folder relating to that business matter. Currently, the user has to search for and locate the folder and move (e.g., drag) the email to and/or save the email in the folder. Performing such searching, locating, moving, and other message processing for a high volume of messages each day can be very time consuming and an inefficient use of the user's time.

Another issue is that conventional applications and user interfaces (UIs), for example, for use with email messages, typically process and present messages in a linear chronological manner to a user. However, a user can desire to have electronic documents, such as messages, and file folders processed and presented to the user based on subject, project, or topic, as opposed to linear chronological presentation of various messages relating to various subjects, projects, or topics.

Yet another issue is that a user often can be working with a group of users (e.g., fellow employees) on a particular project, and the user can take a certain action with regard to an electronic document relating to the project, wherein the action can have an impact on the project. While that user is aware of the action taken with regard to the electronic document and/or the impact on the project, the other users in the group are not aware of the action taken with regard to the electronic document and the impact of such action on the project, and further, the other users may not even be aware of the electronic document if they weren't provided a copy (e.g., via "carbon copy" (cc:)) of the electronic document. For example, the action taken with regard to the electronic document can impact a project timeline and/or status of the project. Conventionally, unless the user proactively takes other action(s) (e.g., email message(s) to the other users, phone call(s) to the other users, face-to-face conversation(s) with the other users) to inform the other users in the group regarding the electronic document, the action the user took with regard to the electronic document, and the impact on the project timeline and/or project status, the other users in the group may not be aware of such information.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the various embodiments in order to provide a basic understanding of some aspects described herein. This summary is not an extensive overview of the disclosed subject matter. It is intended to neither identify key or critical elements of the disclosed subject matter nor delineate the scope of the subject embodiments. Its sole purpose is to present some concepts of the disclosed subject matter in a simplified form as a prelude to the more detailed description that is presented later.

Techniques for automatic sort and propagation of information associated with electronic documents are presented. With regard to an electronic document (e.g., email, text message, voice mail message, web page (e.g., social network page), hypertext document, word processing document, audio file comprising audio content, video file comprising video content, etc.), an enhanced information management component (EIMC) can analyze the electronic document to identify one or more items of key-content (e.g., keywords, keyphrases, key portion of audio or video content, key object, key link, key hyperlink, key electronic item, etc.) (or at least potential items of key-content) based at least in part on one or more tags stored in a data store, wherein the tags also can be respectively associated with electronic file folders in a directory and/or stored in the data store or another desired storage location(s). Automatically, dynamically, or in response to user input received via a user interface (UI) component, the EIMC can associate a tag(s) with the electronic document, and can perform one or more document processing actions in relation to the electronic document.

The one or more document processing actions can comprise, for example, archiving the electronic document in a file folder associated with the tag and/or a subject (e.g., client, project, topic, etc.) to which the electronic document relates; propagating the electronic document, or information relating to the electronic document, from the first communication device (e.g., on which the electronic document was originally displayed) to another communication device(s) (e.g., a communication device that is part of a group of communication devices (or group of users) associated with the tag) and/or modifying an electronic item (e.g., associated with the second communication device; propagating interactions with (e.g., tagging of, identifying specified information in) the electronic document, in part, by searching a data store, message server, online sites, etc., to identify one or more other electronic documents to tag, retrieve, and/or modify, based at least in part on the interactions with the electronic document; generating and/or updating a progress summary or timeline associated with the tag associated with the electronic document based at least in part on information in or associated with the electronic document; transmitting notification messages relating to the electronic document or interactions with the electronic document; generating a file folder comprising relevant electronic documents or other information in relation to a scheduled meeting for a group of users, and providing the file folder to those users (e.g., via their respective communication devices) based at least in part on the tagging of respective electronic documents, information in or associated with the electronic documents associated with the tag(s), the progress summary or timeline associated with the tag(s), etc.; and/or performing another desired document processing action. The EIMC can perform one or more of the document procession actions, based at least in part on user preferences of respective users and predefined document processing criteria, wherein there can be a subset of predefined document processing rules that correspond to the predefined document processing criteria and user preferences, and wherein the predefined document processing rules can be applied by the EIMC when interacting with electronic documents, electronic items (e.g., electronic file folder, icon displayed on a UI display screen, metadata, tags, hyperlinks, links between electronic documents and/or items, links between items of information in an electronic document, etc.), and communication devices.

In an aspect, based at least in part on the results of the analysis of an electronic document, the EIMC can archive the electronic document in an identified file folder automatically or in response to as little as one UI control manipulation (e.g., mouse click). In still another aspect, the EIMC can analyze audio or video content in or associated with an electronic document to facilitate tagging and archiving of such content using the first communication device and/or propagating information relating to such content and/or related subject from the first communication device to a second communication device.

In accordance with various aspects, the disclosed subject matter can comprise a method that includes the acts of linking a tag to an electronic document based on an item of information associated with the electronic document, wherein the item of information corresponds to the tag; and modifying an electronic item associated with the tag based on a subset of information associated with the electronic document.

In accordance with various other aspects, the disclosed subject matter can comprise a system that includes a data store configured to store a subset of tags, wherein the subset of tags comprises a tag associated with a subject. The system can further include an information management component configured to associate the tag with an electronic document based on identification of an item of information that is associated with the electronic document and corresponds to the subject, and modify an electronic item associated with the tag based on information relating to the electronic document.

In accordance with still other aspects, the disclosed subject matter can comprise a computer program product, comprising: a computer readable storage medium comprising computer executable instructions that, in response to execution by a computing system, cause the computing system to perform operations. The operations including linking a tag to an electronic document based on an item of information associated with the electronic document, wherein the item of information corresponds to the tag; and modifying an electronic item associated with the tag based on a subset of information associated with the electronic document.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
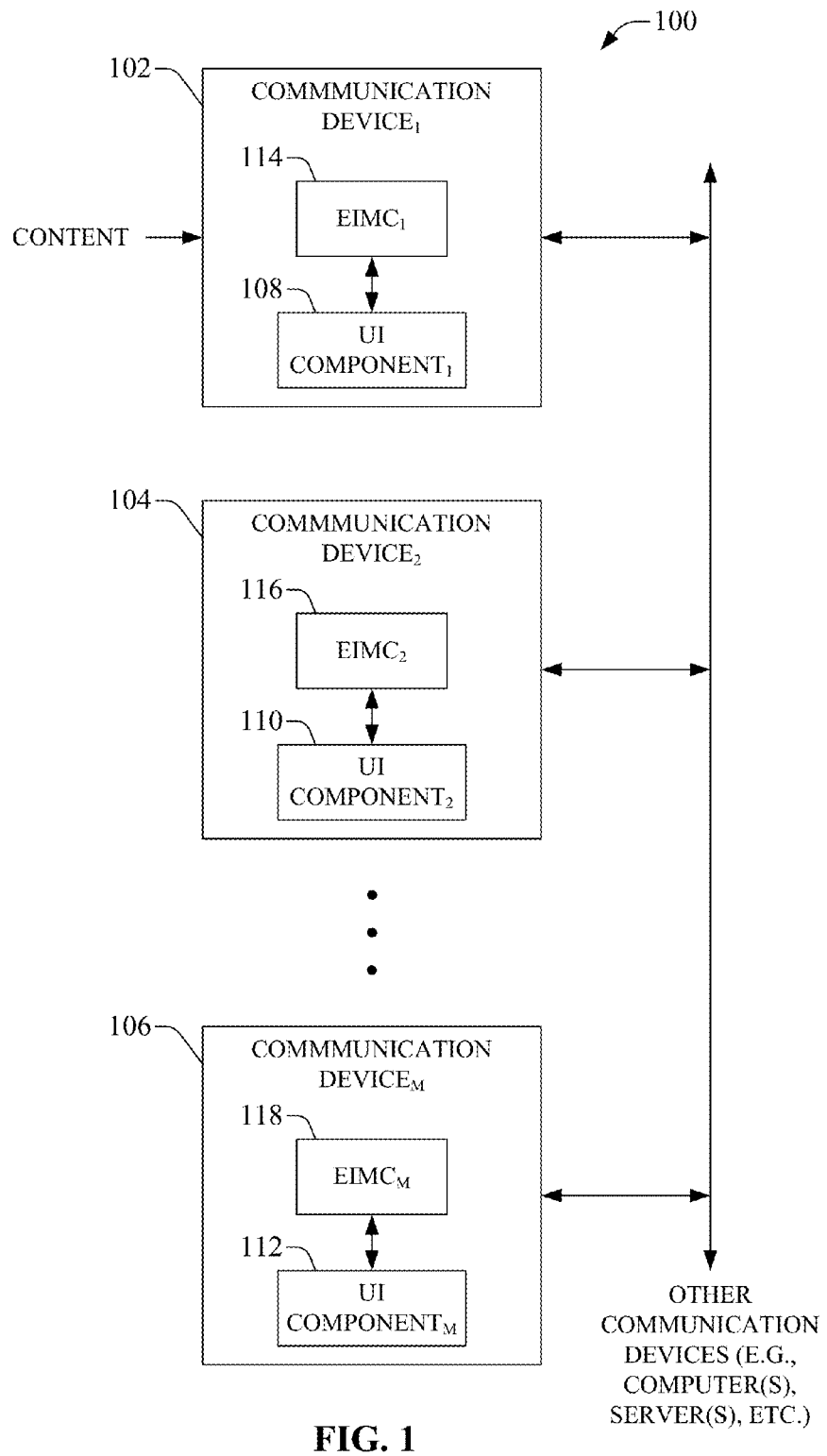
FIG. 1 is a block diagram of an example system that can intelligently process electronic documents and propagate information from a communication device to one or more other communication devices associated with a group in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Communication device users often use their communication devices (e.g., computer, mobile phone (e.g., cellular phone, smart phone), personal digital assistant (PDA), electronic notepad, electronic netbook, electronic gaming device, another type of electronic device with communication capabilities, etc.) to access information or electronic documents from web sites, email server, social network sites, content servers, etc., and to receive and send electronic documents, including messages (e.g., emails, text messages, multimedia messages) and associated content (e.g., audio or video content), and/or social network messages or postings. Some users (e.g., business persons, attorneys, legal assistants, etc.) often receive dozens to hundreds of electronic documents each day. Managing the high volume of electronic documents from the various sources can be very time consuming for users. For instance, when a user receives an email regarding a particular business matter, the user can desire to save the email, and/or related attachment (e.g., word processing document, portable document format (PDF) document, music or video file, etc.) or links (e.g., link to an online page or site), to an electronic file folder to which the email or associated attachment(s) relates, wherein, for example, the folder can be associated with or relate to a particular subject (e.g., a business project, a client matter, product production, type of product or service, company audit, employees, human resources, payroll, employee benefits, etc.). Today, the user has to search for and locate the file folder in the directory and move (e.g., drag) the email or related attachment to and/or save the email or related attachment in the file folder. Performing such searching, locating, moving, and other electronic document processing for a high volume of electronic documents each day can be very time consuming and an inefficient use of the user's time.

Another issue is that conventional applications and UIs, for example, relating to email messages, typically process and present messages in a linear chronological manner to a user. However, a user can desire to have electronic documents, such as messages, and file folders processed and presented to the user based on subject, project, or topic.

Yet another issue is that a user often can be working with a group of users (e.g., fellow employees) on a particular project, and the user can take a certain action with regard to an electronic document relating to the project, wherein the action can have an impact on the project. While that user is aware of the action taken with regard to the electronic document and/or the impact on the project, the other users in the group are not aware of the action taken with regard to the electronic document and the impact of such action on the project, and further, the other users may not even be aware of the electronic document if they weren't provided a copy (e.g., via "carbon copy" (cc:)) of the electronic document. It is desirable to overcome these and other deficiencies in conventional electronic document processing systems and methods. For example, the action taken with regard to the electronic document can impact a project timeline and/or status of the project. Conventionally, unless the user proactively takes other action(s) (e.g., email message(s) to the other users, phone call(s) to the other users, face-to-face conversation(s) with the other users) to inform the other users in the group regarding the electronic document, the action the user took with regard to the electronic document, and the impact on the project timeline and/or project status, the other users in the group may not be aware of such information.

To that end, techniques for automatic sort and propagation of electronic documents are presented. With regard to an electronic document, such as a received message, an enhanced information management component (EIMC) can analyze the document to identify a file folder associated with a subject to which the electronic document relates. Based at least in part on interaction with or tagging of the electronic document in a first user interface (UI) component of a first communication device, predefined user preferences, and predefined document processing criteria, the EIMC can propagate information (e.g., the electronic document, a portion of the electronic document, notification regarding the electronic document or associated subject, information relating to a progress summary or timeline relating to the subject (e.g., work project), etc.) relating to the subject and/or the electronic document to one or more other communication devices (e.g., UI display screens of the other communication device(s)), such as, for example, communication devices associated with users who are associated with the subject (e.g., users who are doing work relating to that subject or project).

For example, the EIMC can analyze or parse the electronic document and can identify key-content (or at least potential key-content), comprising a keyword(s), keyphrase(s), key audio content, key video content, key object(s), key link(s), key hyperlink(s), key electronic item, etc., in the electronic document or attachments associated therewith, and the key-content can be highlighted or emphasized when presented to the user via the UI component. The user can select an item of key-content to tag the electronic document or associated attachment based at least in part on that selected key-content, wherein the selected key-content can be indicative of or relate to the desired tag, associated file folder, associated subject, etc., and/or can perform another desired document processing action(s) (e.g., propagation of information relating to the subject or electronic document to one or more other UI display screens of one or more other communication devices, searching one or more other electronic documents located in a data store(s), a server(s) and/or online site(s) (e.g., to identify another electronic document that relates to the tag, to tag the other electronic document, to modify the other electronic document based at least in part on information in or interaction with the electronic document, etc.), archiving of the electronic document and/or associated attachment(s), modifying a project timeline or a project summary relating to the electronic document, scheduling of a meeting relating to the electronic document or project relating thereto, etc.) by selection of the key-content or other interaction with the electronic document or associated information (e.g., another electronic document(s) attached thereto).

The EIMC also can archive the document in the identified file folder (e.g., associated with a subject, project, topic, etc.) automatically or in response to as little as one UI control manipulation (e.g., click) based at least in part on an identified key-content and/or other information in or associated with the electronic document. For instance, the EIMC can automatically parse an electronic document (e.g., a received email), or can parse the electronic document in response to a command received from a user via the UI, and can identify one or more potential items of key-content, which can be highlighted or emphasized in the display screen of the UI component by the EIMC, wherein the one or more potential items of key-content can or may relate to a tag, associated file folder, associated subject, etc. In an aspect, via the UI component, the user can select an item of key-content (e.g., via a single click on the keyword, keyphrase, or other key-content) from the one or more potential items of key-content, wherein the selected item of key-content can be indicative of or related to the tag, file folder, and/or subject, and the EIMC can store the electronic document in the file folder relating to that tag or subject, wherein the file folder can be associated with a tag relating to the selected keyword. The electronic document also can be associated with the tag (e.g., attach or apply the tag to the electronic document, link the tag to the electronic document, etc.) based at least in part on the selected key-content.

In another aspect, the EIMC can create, modify, and/or update (e.g., automatically, dynamically) a subject (e.g., project) summary or subject timeline based at least in part on tag information associated with an electronic document relating to the subject, interaction by a user or EIMC with the electronic document, and/or information in or associated with the electronic document. Information relating to the subject summary or subject timeline (e.g., as modified or updated) can be presented to the users in a group of users associated with the subject via their respective UI components in accordance with their respective user preferences and the predefined document processing criteria (and corresponding predefined document processing rules). In yet another aspect, at a desired time, such as at or near a time when a subject (e.g., project) meeting is scheduled, the EIMC can retrieve a subset of electronic documents relevant to the subject meeting from a data store(s), based at least in part on tag information associated with the documents and/or the respective user preferences of the users participating in the subject meeting, and can present the subset of electronic documents, or a portion thereof, to the respective users via their respective UI components to enable easy access of such electronic documents by the users prior to or during the meeting.

In still another aspect, the EIMC can analyze audio or video content to facilitate tagging and archiving of such content using the first UI component of a first communication device and/or propagation of information relating to such content and/or related subject to a second UI component of a second communication device.

As used in this application, the terms "component," "system," "platform," "interface," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Referring to the drawings, FIG. 1 is a block diagram of an example system 100 that can intelligently process electronic documents and propagate information from a communication device to one or more other communication devices associated with a group in accordance with various aspects and embodiments of the disclosed subject matter. In an aspect, the system 100 can comprise a plurality of communication devices, including communication device$_1$ 102, and communication device$_2$ 104 through communication device$_M$ 106, wherein M can be virtually any desired integer number. The communication devices, including communication device$_1$ 102, and communication device$_2$ 104 through communication device$_M$ 106, can be communicatively connected to each other via a wireline or wireless communication connection to facilitate voice and data communications between the communication devices in a communication network environment.

A communication device (e.g., 102, 104, 106) can be, for example, a computer, a mobile phone (e.g., cellular phone, smart phone), a PDA, an electronic notepad, an electronic netbook, an electronic gaming device, an Internet Protocol television (IPTV), a set-top box, or another type of electronic device with communication capabilities. The communication device be utilized to access information or electronic documents from web sites, email server, news server, content server, social network sites, etc., and to receive or send electronic documents, including messages (e.g., emails, text messages, multimedia messages) and associated content (e.g., audio or video content), and/or social network messages or postings.

In an aspect, each communication device respectively can include a UI component, wherein communication device$_1$ 102 can include UI component$_1$ 108, communication device$_2$ 104 can include UI component$_2$ 110, and communication device$_M$ 106 can include UI component$_M$ 112. The respective UI components (e.g., 108, 110, 112) can provide one or more desired user interfaces, such as, for example, display screen(s), controls, or other components, that a user can utilize to interact with the UI component and associated components of the system 100 to facilitate performing desired actions, including, for example, actions (e.g., selection of a keyword(s) or keyphrase(s), tagging of electronic documents, saving changes made to an electronic document, storing an electronic document, creating, opening or closing an electronic file folder, etc.) relating to the processing of electronic documents (e.g., message (e.g., email, text message, multimedia message, voice mail message), web page (e.g., social network page), hypertext document, word processing document, audio file comprising audio content, video file comprising video content, and/or related attachments (e.g., attached file(s) to a message) or a hyperlink (e.g., hyperlink to an online page or site), actions relating to objects or electronic items (e.g., icon representative of an electronic document or file folder, window, button or control, menu, etc.) on a display screen(s) of the UI component, etc. In accordance with various embodiments, a UI component (e.g., 108, 110, 112) can comprise a graphical UI (GUI) or touch screen GUI.

In accordance with various aspects and embodiments, a UI component (e.g., 108, 110, 112) can provide one or more GUIs, command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the system 100.

The user can also interact with the regions to select and provide information via various devices such as a mouse, a trackpad (e.g., a single-touch or multi-touch trackpad), a roller ball, a keypad, a keyboard, a pen and/or voice activation, for example. Typically, a mechanism such as a push button or the enter key on the keyboard can be employed subsequent to entering the information in order to initiate the search. However, it is to be appreciated that the disclosed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can provide suitable information, such as alpha-numeric input corresponding to an option provided in the interface prompt or an answer to a question posed in the prompt. It is to be appreciated that the command line interface can be employed in connection with a GUI and/or application programming interface (API). In addition, the command line interface can be employed in connection with hardware (e.g., video cards) and/or displays with limited graphic support, and/or low bandwidth communication channels.

In accordance with various aspects and embodiments, all or a desired portion of the communications devices can comprise an enhanced information management component (EIMC) to facilitate desired (e.g., efficient, optimal, intelligent) processing of electronic documents and communications. For instance, communication device$_1$ 102 can include EIMC$_1$ 114 and be associated with the UI component$_1$ 108, communication device$_2$ 104 can include EIMC$_2$ 116 and be associated with the UI component$_2$ 110, and communication device$_M$ 106 can include EIMC$_M$ 118 and be associated with the UI component$_M$ 112. The EIMC (e.g., 114, 116, 118) of a respective communication device can be utilized to, in accordance with predefined document processing criteria (e.g., which can include specified user preferences, and can correspond with predefined document processing rules), tag an electronic document based at least in part on content of the electronic document; propagate (e.g., forward) information relating to the electronic document, tag or other information associated with the tag from a first communication device (e.g., 102) to another communication device(s) (e.g., 104, 106) (e.g., another communication device(s) in the same group as the first communication device, or another communication device(s) not associated with the same group as the first communication device, when in accordance with the predefined document processing criteria); propagate (e.g., backward) tag information, other information relating to the tag, or information relating to the electronic document to other electronic documents, electronic items (e.g., electronic file folder, electronic icon displayed on a display screen of a UI component, portion of the display screen, tag, link, hyperlink, etc.), and/or other communication devices; archive the electronic document in a file folder associated with the tag automatically or in response to as little as one control manipulation (e.g., mouse click) of a term, phrase, or item (e.g., portion of audio content, portion of video content, object, icon, link, hyperlink, etc.), which represents or is associated with the tag, in the electronic document; generate or modify a timeline, summary, or progress report relating to a subject (e.g., project, topic, client, event, etc.) based at least in part on tagging of electronic documents and results of an analysis of information contained in the electronic documents; modifying information presented in a UI (e.g., a first UI wherein the tagging was performed, or modifying information presented in another UI(s) via propagation based at least in part on actions taken using the first UI and/or actions taken by the EIMC) based at least in part on tagging of electronic documents and results of the analysis of information contained in the electronic documents; creation of a file folder comprising information for a scheduled meeting relating to a subject based at least in part on tagging of electronic documents and the result of the analysis of information contained in the electronic documents; or perform other desired tasks with regard to intelligently and efficiently processing electronic documents.

In accordance with still another aspect, a UI component (e.g., 108, 110, 112) can employ voice recognition to facilitate intelligent processing of messages using electronic document processing controls, such as an activation control to manually activate intelligent processing and tagging of an electronic document, a select control to select an item of key-content, or other information in or associated with an electronic document, an archiving control to archive an electronic document, a play control to play audio or video content of or associated with an electronic document, and/or other controls, as disclosed herein. In yet another aspect, a UI component (e.g., 108, 110, 112) can allow the user to use hybrid instructions to have the UI component and associated EIMC (e.g., 114, 116, 118) intelligently process electronic documents, wherein for instance, the user can input a voice command for one portion of the electronic document processing and a mouse click, keyboard selection, or screen touch, for another portion of the electronic document processing with regard to a particular electronic document.

With regard to tags, in accordance with various aspects, a tag can be a private tag or a public tag. A private tag can be associated with a select group of users, wherein only users (and associated communication devices) in the select group are associated with the private tag, permitted to tag an electronic document with the private tag, and/or are permitted to view the modifications to a UI display screen of a UI component (e.g., 108, 110, 112) or electronic documents based at least in part on the tagging of an electronic document(s) by that private tag (e.g., propagation of information relating to an electronic document tagged with the private tag. User groups and private tagging can be enforced, for example, by authenticating users and controlling access to electronic documents and tags based at least in part on authentication or identification of users (or associated communication devices), as more fully described herein. A public tag can be a tag that is available for use by any user that desires to employ the EIMC (e.g., 114, 116, 118) to tag electronic documents.

Figure 2:
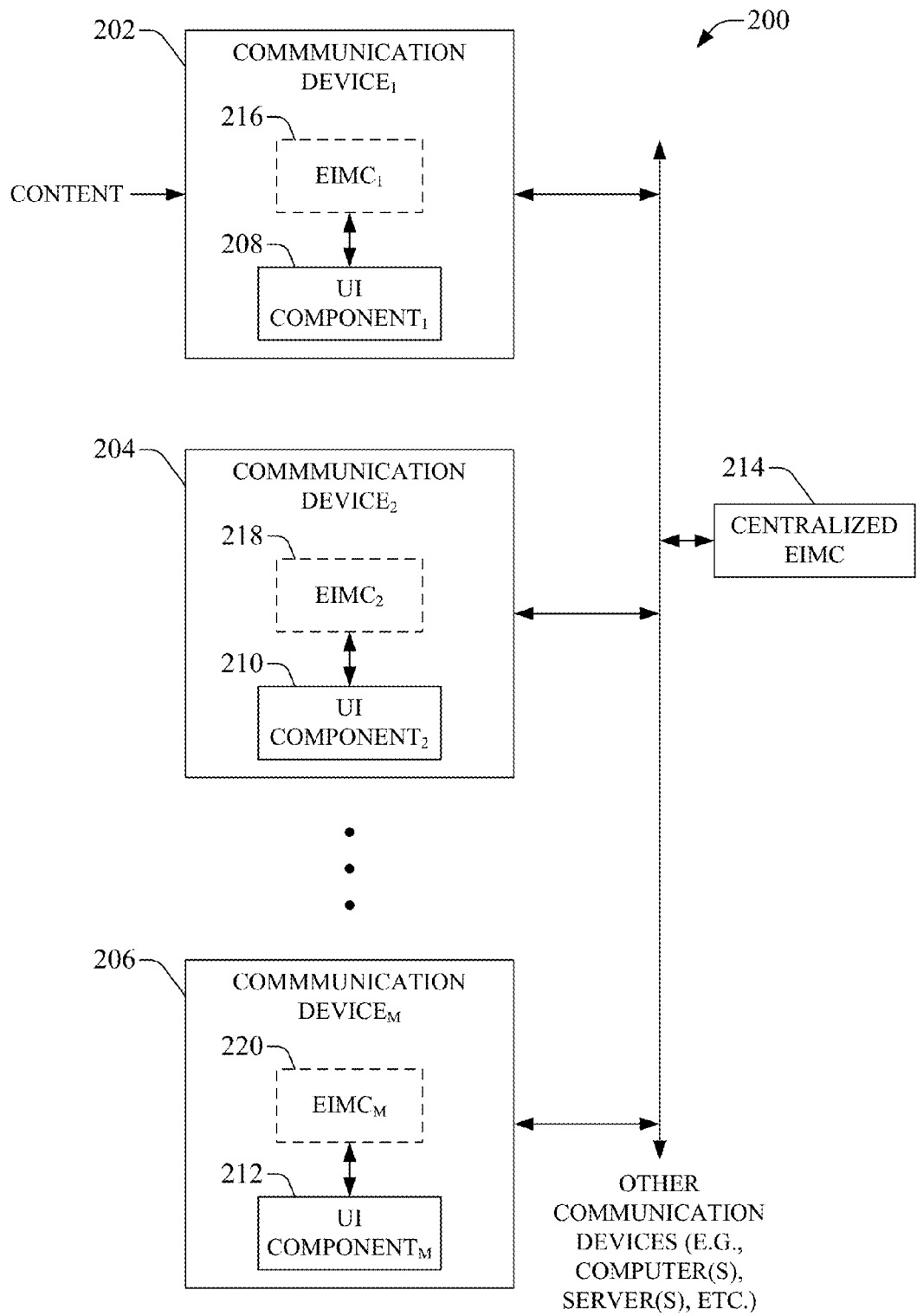
FIG. 2 depicts a diagram of an example system that can employ a centralized Enhanced Information Management Component (EIMC) to facilitate intelligently processing electronic documents and propagating information from a communication device to one or more other communication devices associated with a group in accordance with various aspects and embodiments of the disclosed subject matter.

Turning briefly to FIG. 2, depicted is a block diagram of another example system 200 that can employ a centralized EIMC to facilitate intelligently processing electronic documents and propagating information from a communication device to one or more other communication devices associated with a group in accordance with various aspects and embodiments of the disclosed subject matter. In an aspect, the system 200 can comprise a plurality of communication devices, including communication device$_1$ 202, and communication device$_2$ 204 through communication device$_M$ 206, wherein M can be virtually any desired integer number. The communication devices, including communication device$_1$ 202, and communication device$_2$ 204 through communication device$_M$ 206, can be communicatively connected to each other via a wireline or wireless communication connection to facilitate voice and data communications between the communication devices in a communication network environment.

In another aspect, each communication device respectively can include a UI component, wherein communication device$_1$ 202 can include UI component$_1$ 208, communication device$_2$ 204 can include UI component$_2$ 210, and communication device$_M$ 206 can include UI component$_M$ 212. In accordance with still another aspect, the system 200 can include a centralized EIMC 214 that can be communicatively connected to each of the communication devices 202, 204 and 206 to facilitate processing electronic documents and other electronic items, presentation of electronic documents or items in the respective UIs of the communication devices 202, 204 and 206, tagging of electronic documents, propagation of information from one communication device to another communication device(s), etc., as more fully disclosed herein.

In accordance with an embodiment, one or more of the communication devices (e.g., 202, 204, 206) optionally can include a local EIMC, such as EIMC$_1$ 216, EIMC$_2$ 218 and/or EIMC$_M$ 220 (depicted in FIG. 2 with dotted lines to indicate they are optional), that can locally process electronic documents and can coordinate with the centralized EIMC 214 to facilitate processing electronic documents, in accordance with the various aspects, as more fully disclosed herein. The respective components (e.g., communication device, UI component, EIMC, etc.) each can be the same as or similar to, or can comprise the same or similar functionality as, respective components (e.g., respectively named components), as more fully disclosed herein.

Figure 3:
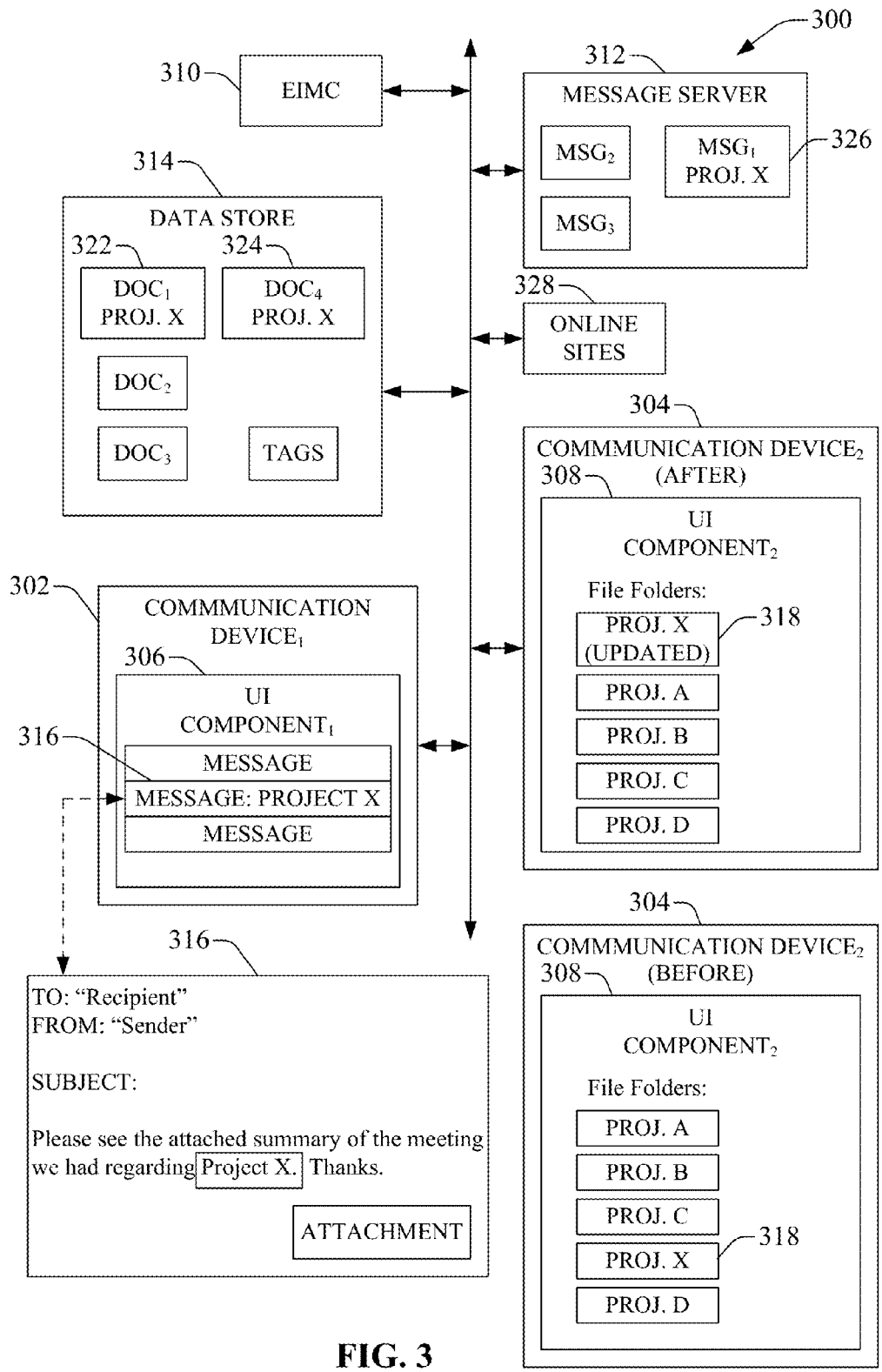
FIG. 3 illustrates a block diagram of an example system that can propagate information relating to an electronic document from a communication device to one or more other communication devices (e.g., other communication devices associated with a group) in accordance with various aspects and embodiments of the disclosed subject matter.

Referring briefly to FIG. 3 (along with FIG. 1 and FIG. 2), depicted is a system 300 that can propagate information relating to an electronic document from a communication device to one or more other communication devices (e.g., other communication devices associated with a group) in accordance with various aspects and embodiments of the disclosed subject matter. The system 300 can include a plurality of communication devices, including communication device$_1$ 302 and communication device$_2$ 304. The communication devices, including communication device$_1$ 302 and communication device$_2$ 304, can be communicatively connected to each other via a wireline or wireless communication connection to facilitate voice and data communications between the communication devices in a communication network environment.

In another aspect, each communication device respectively can include a UI component, wherein communication device$_1$ 302 can include UI component$_1$ 306 and communication device$_2$ 304 can include UI component$_2$ 308. In accordance with still another aspect, the system 300 can include an EIMC 310 (e.g., a centralized EIMC or an EIMC(s) residing in the respective communication devices) that can be associated with the communication devices 302 and 304 to facilitate processing electronic documents and other electronic items, propagation of information relating to an electronic document from one communication device to another communication device(s), presentation of electronic documents or items in the respective UIs of the communication devices 302 and 304, tagging of electronic documents, etc., as more fully described herein. The respective components (e.g., communication device, UI component, EIMC, etc.) each can be the same as or similar to, or can comprise the same or similar functionality as, respective components, as more fully disclosed herein. While the EIMC 310 is depicted as being a separate component, it is to be appreciated that the EIMC 310 can comprise a single centralized EIMC and/or one or more local EIMCs that can be part of the respective communication devices (e.g., 302, 304) of the system 300.

In an aspect, the EIMC 310 and the communication devices 302 and 304 each can be associated with (e.g., communicatively connected to) a message server 312 via a wireline or wireless communication connection, wherein the message server 312 can comprise one or more messages (e.g., email messages, text messages, multimedia messages, voice mail messages, etc.) received from or destined to communication devices (e.g., 302, 304) in the communication network environment. The respective users of the communication devices 302 and 304 can access their respective messages from the message server 312 or can draft and communicate messages via the message server 312 to other communication devices, for example, when the users and associated communication devices 302 and 304 are granted access to the message server 312, or a portion thereof.

In another aspect, the EIMC 310 and the communication devices 302 and 304 each can be associated with (e.g., communicatively connected to) a data store 314 via a wireline or wireless communication connection, wherein the data store 314 can have stored therein one or more electronic documents, one or more electronic file folders, and/or one or more other electronic items. The respective users of the communication devices 302 and 304 can access electronic documents, file folders, or items from the data store 314 or can create and/or store electronic documents, file folders, or items in the data store 314, for example, when the users and associated communication devices 302 and 304 are granted access to the data store 314, or a portion thereof.

In accordance with various aspects, the EIMC 310 can propagate information relating to an electronic document (e.g., propagate forward) from a first communication device 302 to a second communication device 304 and/or propagate information relating to an electronic document (e.g., propagate backward) associated with a first communication device 302 to one or more other electronic documents, file folders or items associated with the message server 312 and/or data store 314, based at least in part on tag information associated with such electronic document.

For instance, a user can be using a first communication device 302 to receive one or more messages utilizing a message application, wherein the one or more messages can be presented to the user via the UI component$_1$ 306. In processing a message 316, the EIMC 310 can analyze or parse the electronic document 316 (e.g., message), including, for example, the sending address, information in the subject header, message content in the main body of the message, attachment to the electronic document 316, and/or metadata associated with electronic document 316, to identify an item(s) of key-content that can indicate to what subject (e.g., project, topic, event, client, etc.) the electronic document 316 relates, wherein the item(s) of key-content can be the same as or similar to, and/or can correspond to, one or more tag words stored in a data store 314 and respectively associated with one or more file folders stored in a data store 314.

For instance, there can be a file folder 318 named "Project X" and/or associated with the tag "Project X". The EIMC 310 can analyze or parse the electronic document 316 and can identify that the electronic document 316 contains the phrase "Project X" 320 in the main body of the electronic document 316, and can identify that there is a file folder 318 in the data store 314 that is associated with the tag "Project X", and can thereby identify the phrase "Project X" 320 as a keyphrase. Automatically or in response to selection (e.g., via a single click) of the keyphrase "Project X" 320 by the user via the UI component 306, the EIMC 310 can store the electronic document 316 in the file folder 318 (e.g., file folder named "Project X") associated with the tag "Project X". When the archiving of the electronic document 316 is being done in response to selection by the user, the EIMC 310 also can highlight or emphasize the identified item(s) of key-content (e.g., keyphrase "Project X" 320) on the display screen of the UI component 306 to differentiate the identified item(s) of key-content from other content in the electronic document 316 to facilitate selection of the identified item(s) of key-content by the user.

Also, the highlighting (e.g., using color(s) with regard to the text or the portion of the UI screen on which the text is displayed) or emphasizing (e.g., bolding, italicizing, or changing the size) of the item(s) of key-content can be varied (e.g., using different colors, different types of highlighting or emphasis), based at least in part on the level of confidence (e.g., green indicates high level of confidence or exact match, yellow indicates a medium level of confidence, and red indicates a low level of confidence) there is that the identified item(s) of key-content is associated with a tag word or tag phrase in the data store 314, or to differentiate one potential item(s) of key-content from another item(s) of key-content in the electronic document. For example, if the electronic document contained the phrase "X Project" instead of the phrase "Project X", the EIMC 310 can highlight the phrase "X Project" (e.g., as a potential keyphrase) using a color (e.g., yellow, instead of green) or other indicator to indicate to the user that "X Project" and the associated electronic document may be related to the tag "Project X" and the associated file folder, but that there was not an exact match to the tag "Project X". As another example, if the electronic document contained the phrase "electronic purchase" and there is a tag for "electronic wallet" in the data store 314, the EIMC 316 can highlight the phrase "electronic purchase" (e.g., as a potential keyphrase) using a color (e.g., yellow, instead of green) or other indicator to indicate to the user that "electronic purchase" and the associated electronic document may be related to the tag "electronic wallet" and the associated file folder, but that there was not an exact match to the tag "electronic wallet". Similarly, the EIMC 316 can identify potential keywords or keyphrases, even when misspelled, in the electronic document, and the potential keywords or keyphrases can be highlighted or emphasized to indicate that such potential keywords or keyphrases may be a match to a tag, but the level of confidence is lower because the potential keywords or keyphrases were not an exact match to a stored tag.

In still another aspect, the EIMC 310 can propagate information relating to the electronic document 316 and/or "Project X" to one or more communication devices (e.g., 304) of one or more other users (e.g., users in the same user group), based at least in part on the predefined document processing criteria and user preferences. For instance, when in accord with the predefined document processing criteria and user preferences, the presentation or display of an electronic item, such as file folder 320 for "Project X", can be modified on the display screen of the UI component 308 of the second communication device 304 based at least in part on information in or associated with the electronic document 316, and/or interaction with and/or actions taken with regard to the electronic document 316 by the EIMC 310 or the first user of the first communication device 302 via the UI component 306. For example, as shown in FIG. 3 in the BEFORE view of the UI component 308 of the second communication device 304, which is prior to the electronic document 316 being interacted with in the first communication device 302, the presentation of a plurality of file folders, including file folder 318 for "Project X", on the display screen of the UI component 308 can be such that the file folder 318 can be ranked fourth out of the five displayed file folders from top of the display screen to bottom. For instance, when specified by the predefined document processing criteria and user preferences, as shown in FIG. 3 in the AFTER view of the UI component 308 of the second communication device 304, which is after the electronic document 316 has been interacted with in the first communication device 302, the presentation of the plurality of file folders, including file folder 318 for "Project X", on the display screen of the UI component 308 can be modified such that the file folder 318 can be ranked first out of the five displayed file folders from top of the display screen to bottom and/or the file folder 318 can be emphasized or highlighted, which can indicate to the second user of the second communication device 304 that there has be a change to the file folder 318.

Figure 4:
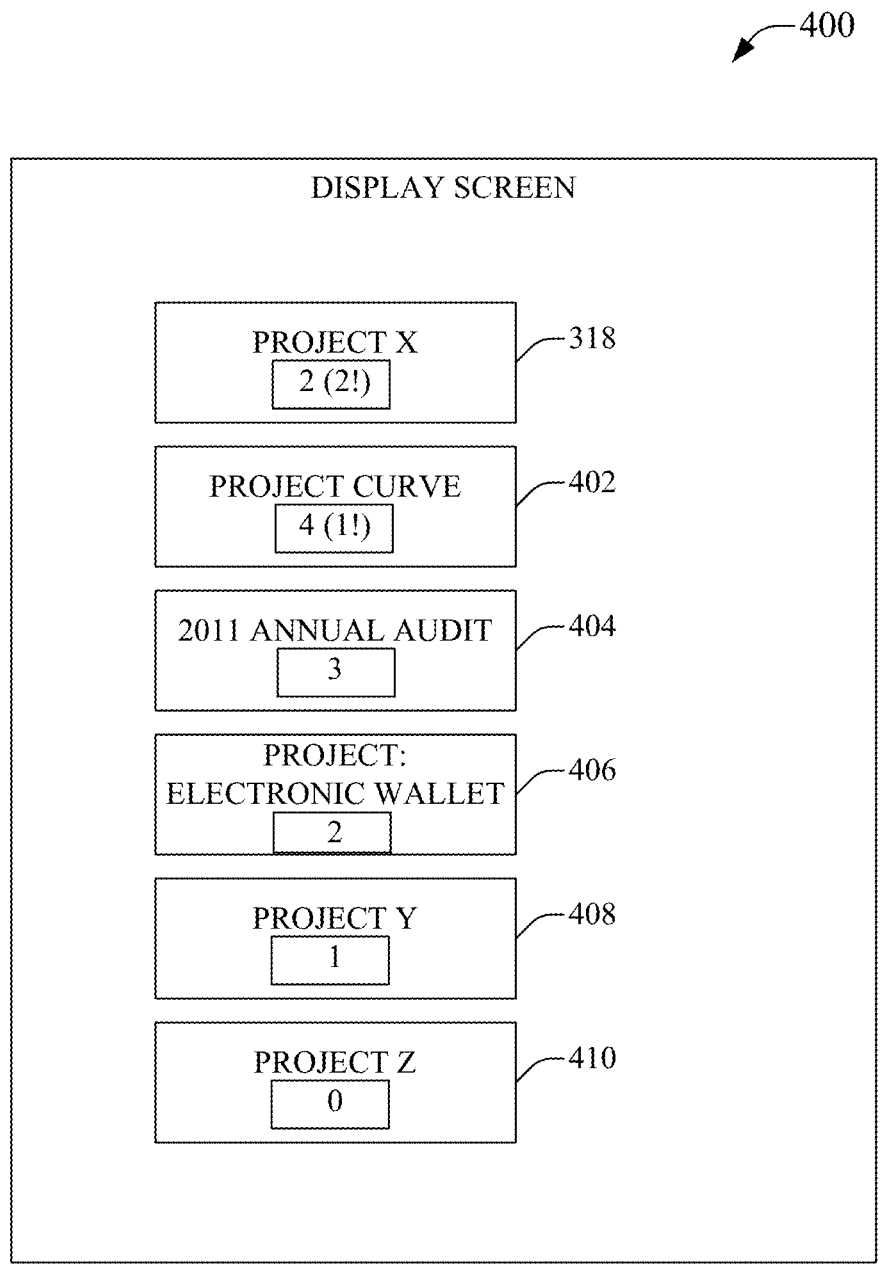
FIG. 4 depicts a block diagram of an example display screen of a user interface (UI) component of a second communication device in accordance with various aspects.

Referring briefly to FIG. 4 (along with FIGS. 1, 2 and 3), illustrated is a diagram of an example display screen 400 of the UI component 308 of the second communication device 304 in accordance with various aspects. The display screen 400 illustrates how file folders can be arranged in relation to each other and how various types of information relating to the content in the respective file folders can be presented to the user via the display screen 400, in accordance with the predefined document processing criteria and user preferences. For instance, when desired, the predefined document processing criteria and user preferences can specify that the EIMC 310 is to arrange the file folders from top to bottom on the display based at least in part on the respective number of new electronic documents (e.g., messages, word processing documents, social network posts, etc.) received (or modified) for each file folder over a specified time period (e.g., since the user last interacted with the electronic documents or the UI component, a specified amount of time, such as 1 hour, etc.), the respective number of priority or time-sensitive electronic documents received or modified over the specified time period, and/or the respective time-sensitivity of the respective electronic documents in the file folder, in accordance with a specified arrangement algorithm. For example, as desired, in accordance with the predefined document processing criteria and user preferences, the specified arrangement algorithm can provide that the file folders are to be arranged from the file folder having the highest number of new electronic documents over the specified time period being presented at the top of the display down to the file folder having the lowest number of new electronic documents over the specified time period being presented at the bottom of the display, unless a file folder contains a new electronic document(s) that has a higher priority or is more time-sensitive (e.g., the amount of time to take action with regard to the time-sensitive electronic document is close to running out) than electronic documents in the other file folders, in which case the file folder that contains the new electronic document(s) having a higher priority or more time-sensitive electronic document is to be arranged and presented at a higher rank than the other file folders, with the remaining folders ranked based on the respective number of new messages.

In another aspect, the respective icons of the file folders or other regions of the display screen 400 that are in proximity to the file folders can comprise information relating to the respective file folders, wherein the information can comprise, for example, the respective number of new electronic documents received (or modified) for each file folder over the specified time period, the respective number of priority or time-sensitive electronic documents received or modified over the specified time period, and/or the respective time-sensitivity of the respective electronic documents in the file folder.

Examples of the above-described aspects are shown in display screen 400. The display screen 400 can display a plurality of file folders relating to various subjects, wherein, for instance, the file folder 318 can relate to "Project X" and can be associated with tag phrase "Project X", file folder 402 can relate to "Project Curve" and can be associated with tag phrase "Project Curve", file folder 404 can relate to "2011 Annual Audit" and can be associated with tag phrase "2011 Annual Audit", file folder 406 can relate to "Project: Electronic Wallet" and can be associated with tag phrase "Project: Electronic Wallet", file folder 408 can relate to "Project Y" and can be associated with tag phrase "Project Y", and file folder 410 can relate to "Project Z" and can be associated with tag phrase "Project Z". For instance, file folder 318 can comprise 2 new electronic documents over the specified time period, as shown with the number 2 indicated on the file folder 318, with those 2 new electronic documents being priority or time-sensitive electronic documents as indicated by the indicator "2!", wherein the character "!" can indicate that those electronic documents are of higher priority or are time sensitive in nature. File folder 402 can comprise 4 new electronic documents over the specified time period as shown with the number 4 indicated on the file folder 402, with 1 of those new electronic documents being a priority or time-sensitive electronic document as indicated by the indicator "1!". File folder 404 can comprise 3 new electronic documents over the specified time period as shown with the number 3 indicated on the file folder 404, with none of those new electronic documents being labeled as a priority or time-sensitive electronic document. File folder 406 can comprise 2 new electronic documents over the specified time period as shown with the number 2 indicated on the file folder 406, with none of those new electronic documents being labeled as a priority or time-sensitive electronic document. File folder 408 can comprise 1 new electronic document over the specified time period as shown with the number 1 indicated on the file folder 408, with that new electronic document not being labeled as a priority or time-sensitive electronic document. File folder 410 is shown having no new electronic documents over the specified time period as shown with the number 0 (or alternatively having no number shown) indicated on the file folder 410.

As shown on the display screen 400, the plurality of file folders can be displayed with the file folder 318 being ranked and presented highest, even though the file folder 318 does not have the most new electronic documents, because the file folder 318 has the highest number of higher priority or time-sensitive electronic documents as compared to the other file folders. File folder 402 can be ranked and presented as second highest, because it has a higher number of higher priority or time-sensitive electronic documents as compared to the other file folders 404 through 410, except for file folder 318. The remaining file folders 404 through 410 can be ranked with the file folder having the higher number of messages ranked higher than the other file folders.

The disclosed subject matter can thereby propagate information between communication devices based at least in part on intelligent document processing, including tagging, of electronic documents or items; and can present information to a user on a UI display screen in a more efficient and relevant manner by presenting the information on the UI display screen based at least in part on the subject matter (e.g., work project, topic, client, etc.) that is most relevant to the user at the time the user is viewing information on the UI display screen, as opposed to simply presenting information to the user in a linear chronological manner (although the disclosed subject matter also can be configured to display information on the UI display screen in a linear chronological manner, if and when desired by the user).

With regard to FIG. 3, in accordance with yet another aspect, the EIMC 310 also can propagate (e.g., backward) information relating to an electronic document 316 to other electronic documents or items. For instance, when a tag has been associated with a first electronic document by the EIMC 310, based at least in part on such tagging of the first electronic document, the EIMC 310 can search (e.g., dynamically, automatically, or in response to a request received from a user via a communication device) a subset of electronic documents (e.g., in a data store 314, on a message server 312, and/or on an online site(s) 328), identify a second electronic document contained in the subset of electronic documents based at least in part on the second electronic document comprising a second item of information that corresponds to the tag, associate the tag to the second electronic document, and store the first electronic document and the second electronic document in an electronic file folder associated with the tag.

For example, if the file folder 318 is being newly created to store the electronic message 316 and is newly associated with the tag "Project X", the EIMC 310, after archiving the electronic document 316 in, or associating the electronic document 316 with, the file folder 318, the EIMC 310 can search for other electronic documents or items, which are or potentially may be related to the tag "Project X", in the data store 314, in the message server 312, on an online site or page(s) (e.g., social network web site, news web site, etc.), based at least in part on the tag. For instance, the EIMC 310 can search electronic documents and items in the data store 314 and can identify electronic document 322 and electronic document 324 as including or being associated with the tag "Project X" and can tag and/or associate the electronic documents 322 and 324 with the tag "Project X" and/or can store the electronic documents 322 and 324 (e.g., copies of electronic documents 322 and 324) in the file folder 318 associated with the tag "Project X". The EIMC 310 also can search electronic documents or items in the message server 312 and can identify electronic document 326 as including or being associated with information relating to the tag "Project X" and can tag and/or associate the electronic document 326 with the tag "Project X" and/or can store the electronic document 326 (e.g., a copy of electronic document 326) in the file folder 318. As desired, the EIMC 310 also can search one or more online sites 328 to determine whether any of the one or more online sites 328 comprise or are associated with information (e.g., blogs, comments, audio or video content, or other online posts) relating to the tag "Project X" and, if the EIMC 310 does identify such an online site, the EIMC 310 can generate an electronic document that includes a copy of the online site, the online address, or other information relating to the online site, and can tag and/or associate that electronic document with the tag "Project X" and/or can store that electronic document in the file folder 318.

In another aspect, the UI display screen of one or more of the communication devices (e.g., 302, 304) can be updated based at least in part the newly identified and tagged electronic documents, wherein, for example, for each UI display screen, the order or ranking of the file folders can be modified and/or information (e.g., number of newly identified electronic documents, priority of newly identified electronic documents, time sensitivity of newly identified electronic documents, etc.) relating to the changes to the respective file folders (e.g., file folder 318 relating to "Project X") can be generated and presented on the respective UI display screen.

In still another aspect, as desired, the EIMC 310 can be configured to periodically search online sites (e.g., a specified subset of online sites, or perform a search using a general online search engine) for web pages having key-content that are or may be a match to a stored tag, identify online sites or web pages that have or potentially have key-content that are or may be a match to a stored tag, and save copies of the identified online sites or web pages in the appropriate file folder(s) associated with the corresponding tag.

In another aspect, an electronic document can be tagged with more than one tag. For example, an electronic document can be related to a first project (e.g., Project X) and also be related to a second project (e.g., Project Y). In such instance, the EIMC 310 can tag the electronic document with a first tag to associate the electronic document with the first project and with a second tag to associate the electronic document with the second project, and copies of the electronic document can be stored in a first file folder associated with the first tag and a second file folder associated with the second tag.

Figure 5:
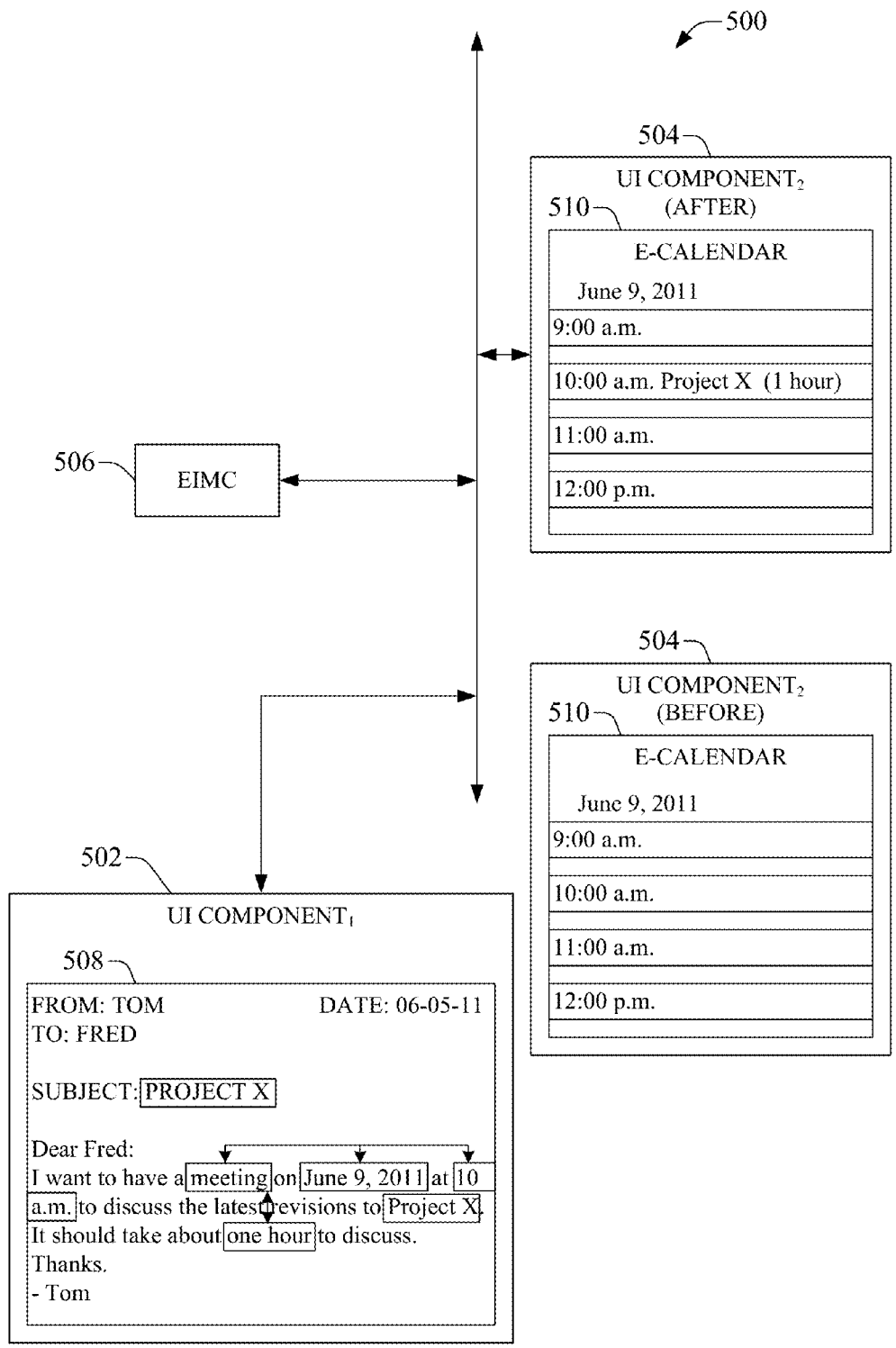
FIG. 5 illustrates a block diagram of an example system that can propagate information (e.g., scheduling related information) from a communication device to one or more other communication devices associated with a group in accordance with various aspects and embodiments of the disclosed subject matter.

Referring briefly to FIG. 5 (along with FIGS. 1, 2, and 3), depicted is a diagram of an example system 500 that can propagate information (e.g., scheduling related information) from a communication device to one or more other communication devices associated with a group in accordance with various aspects and embodiments of the disclosed subject matter. In accordance with various aspects, the system 500 can include a first UI component 502 (also referred to herein and in FIG. 5 as UI component$_1$ 502) associated with a first communication device (not shown for reasons of brevity and clarity) and a second UI component 504 (also referred to herein and in FIG. 5 as UI component$_2$ 504) associated with a second communication device (not shown for reasons of brevity and clarity). The system 500 also can comprise an EIMC 506 that can analyze an electronic document to determine whether there is any content in or associated with the electronic document that is related to a tag (e.g., tag word or tag phrase) stored in the data store (e.g., 314), highlight or emphasize any key-content (e.g., keyword or keyphrase) in the electronic document that is or may be related to the tag, archive the electronic document in a file folder associated with the tag, propagate information to the second UI component 504 based at least in part on interaction with (e.g., action(s) taken with regard to) the electronic document by the EIMC 506 or the first UI component 502, and/or perform another document processing action(s) or task(s) with regard to the electronic document, such as more fully described herein. The first UI component 502, second UI component 504, and EIMC 506 each can be the same as or similar to, or can comprise the same or similar functionality as respective components (e.g., respectively or similarly named components), as more fully described herein.

Initially, prior to an analysis of an electronic document 508 received or displayed by the first UI component 502 (e.g., with regard to a first user (e.g., Fred)), the second UI component 504 can contain, display, or be associated with an electronic calendar 510 (also referred to herein and in FIG. 5 as e-calendar 510) (e.g., for a second user). During this time, in the electronic calendar 510, there is no event item scheduled for Jun. 9, 2011, as shown in the BEFORE version of the display screen of the UI component 504. As more fully described herein, the EIMC 506 can propagate information relating to the electronic document 508, which is received or displayed by the first UI component 502, to the second UI component 504, in accordance with the predefined document processing criteria and user preferences.

In an aspect, when the electronic document 508 (e.g., email message) is received or displayed by the first UI component 502 (or received by a server (e.g., email server) associated with the first UI component or first user), the EIMC 506 can analyze or parse the electronic document 508 to identify potential keywords or keyphrases, and to identify other potentially relevant information, such as event related information (e.g., meeting information, deadline information, parties to be involved with the event, etc.), in or associated with the electronic document 508. For example, the EIMC 506 can identify the phrase "Project X" in the electronic document 508 as a potential keyphrase based at least in part on the phrase "Project X" matching the tag "Project X" retrieved from the data store (e.g., 314), and can highlight or emphasize the keyphrase "Project X" in the electronic document 508. Also, the EIMC 506 can identify other potentially relevant information, such as the term "meeting", the date "Jun. 9, 2011", the time "10 a.m.", an amount of time "1 hour", and the message sender "Tom", and can highlight or emphasize this other potentially relevant information in the electronic document 508. As specified by the predefined document processing criteria and user preferences, the EIMC 506 can highlight or emphasize the other potentially relevant information differently from or the same as the identified keyphrase. For instance, if desired, the other potentially relevant information can have a different highlight color than the color used to highlight the keyphrase, and/or the EIMC 506 can generate and display links between the various potentially relevant items of information in the electronic document 508 that are determined by the EIMC 506 to be related to each other (e.g., the term "meeting" determined to be related to the date, time, and amount of time contained in the electronic document 508 based at least in part on their proximity to each other in the electronic document 508 and the common relationship of the term "meeting" being associated with a date, time, and/or amount of time in a message).

The predefined document processing criteria and/or user preferences can specify that the second user associated with the second UI component 504 is part of a group of users, which can include the first user as well, who are associated with the tag phrase "Project X", and can further specify that when information, such as event related information, is received by another user in that group, such information is to be provided to the second user via the second UI component 504 of the second communication device. In accordance with the predefined document processing criteria and/or user preferences, the EIMC 506 can determine that the event related information contained in the electronic document 508 is to be propagated forward to the second UI component 504 associated with the second user, and the EIMC 506 can modify the UI display screen of the second UI component 504 and/or the electronic calendar associated with the second UI component 504 based at least in part on the event related information identified in the electronic document 508 received or displayed by the first UI component 502. For example, the EIMC 506 can modify (e.g., automatically or dynamically) the electronic calendar 510 associated with the second UI component 504 to include an event item (e.g., meeting relating to "Project X" with Fred and Tom) scheduled for Jun. 9, 2011 at 10:00 a.m. If and when specified by user preferences, the EIMC 506 can have that event item scheduled only tentatively until confirmed by the second user, can identify and notify a user of a scheduling conflict (if there is another event item scheduled during that time period), and/or can provide a separate electronic notification (e.g., email or text message, notification displayed in the second UI component 504 (e.g., notification displayed on or in proximity to the file folder 318 associated with "Project X"), etc.) to the second user to notify the second user of the new event item in the electronic calendar.

Figure 6:
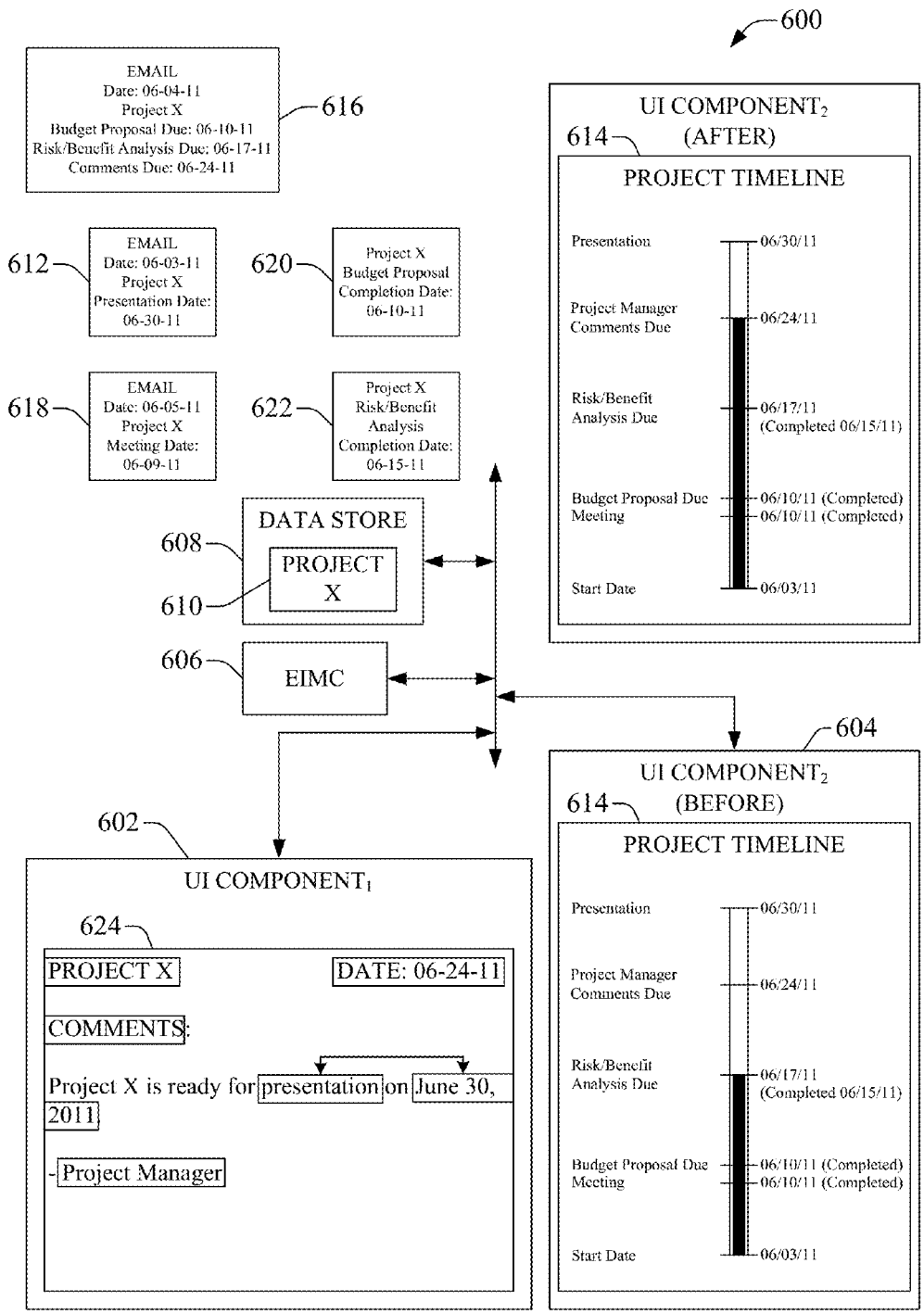
FIG. 6 illustrates a block diagram of an example system that can generate and propagate project related information for a project associated with a group of communication devices and associated users in accordance with various aspects and embodiments of the disclosed subject matter.

Turning briefly to FIG. 6 (along with FIGS. 1, 2, and 3), depicted is a diagram of an example system 600 that can generate and propagate project related information for a project associated with a group of communication devices and associated users in accordance with various aspects and embodiments of the disclosed subject matter. In accordance with various aspects, the system 600 can include a first UI component 602 (also referred to herein and in FIG. 6 as UI component$_1$ 602) associated with a first communication device (not shown for reasons of brevity and clarity) and a second UI component 604 (also referred to herein and in FIG. 6 as UI component$_2$ 604) associated with a second communication device (not shown for reasons of brevity and clarity). The system 600 also can comprise an EIMC 606 that can analyze an electronic document to determine whether there is any content in or associated with the electronic document that is related to a tag word or phrase stored in the data store (e.g., 314), highlight or emphasize any content (e.g., keyword or keyphrase) in the electronic document that is or may be related to the tag, archive the electronic document in a file folder associated with the tag, propagate information to the second UI component 604 based at least in part on interaction with (e.g., action(s) taken with regard to) the electronic document by the EIMC 606 or the first UI component 602, generate (e.g., automatically), modify (e.g., automatically) and/or present (e.g., present to the first communication device and/or propagate and present on the second communication device) a project summary and/or project timeline for a project based at least in part on a subset of electronic documents associated with a tag relating to the project, and/or perform another document processing action(s) or task(s) with regard to the electronic document, such as more fully described herein. The system 600 also can include a data store 608 that can be associated with the EIMC 606, first UI component 602, and second UI component 604. The data store 608 can receive, store, and provide electronic documents, including the subset of electronic documents relating to the project. The first UI component 602, second UI component 604, EIMC 606, and data store 608 each can be the same as or similar to, or can comprise the same or similar functionality as respective components (e.g., respectively or similarly named components), as more fully described herein.

As an example, the data store 608 can include a file folder 610 associated with the tag "Project X", wherein the file folder 610 was created by the EIMC 606 in response to an email message 612 received by the first communication device associated with the first UI component 602. Based at least in part on analysis of the email message 612 and/or actions of the first user of the first communication device, the EIMC 606 identified "Project X" as an item of key-content, generated the file folder 610, generated a tag "Project X", which was applied to the file folder 610 and email message 612, and the email message 612 was stored in the file folder 610 in the data store 608. When analyzing and parsing the email message 612, the EIMC 606 also identified a time landmark in the email message 612, wherein the email message included information indicating the date for the presentation relating to "Project X" is Jun. 30, 2011. In an aspect, the EIMC 606 can generate (e.g., automatically) a project summary and/or project timeline 614 relating to "Project X" that can be provided to the group of communication devices (and/or associated users) that are identified as being associated with "Project X". The project summary and/or project timeline 614 can be provided (e.g., automatically) to the group of communication devices (and/or associated users) that are identified as being associated with "Project X".

As further example, a subsequent email message 616 can be received by the first communication device. The EIMC 606 can analyze and/or parse email message 616 and identify that this email message 616 includes the keyphrase "Project X", and further can identify certain time landmarks in the message 616, wherein the time landmarks include a deadline date of Jun. 10, 2011, for drafting a budget proposal relating to "Project X", a deadline date of Jun. 17, 2011, for preparing a risk/benefit analysis relating to "Project X", and a deadline date of Jun. 24, 2011, for the project manager (the first user associated with the first communication device) to provide comments relating to "Project X". In an aspect, the EIMC 606 can generate and apply the tag "Project X" to the email message 616, and update (e.g., modify) the project summary and/or project timeline 614 relating to "Project X" to include the additional time landmarks and/or other information relating to the "Project X". When the project summary and/or project timeline 614 is updated, the EIMC 606 can generate (e.g., automatically) and send (e.g., automatically) a notification message (e.g., email message, text message) to the communication devices of users in the group related to "Project X", and/or can modify the display screens of the respective UI components (e.g., 602, 604) to reflect the updates or changes relating to "Project X" (e.g., modify the ranking of file folders as they are displayed in a UI component (e.g., 602, 604) associated with a group member so that the file folder relating to "Project X" is ranked higher than other file folders that have not been modified or otherwise do not have as high of a priority as other subject matter of other file folders, and/or provide information, which indicates the file folder for "Project X" has been modified, on or in proximity to the file folder icon associated with "Project X" when displayed by the UI component, etc.). The updated project summary and/or project timeline 614 can be provided to the group of communication devices (and/or associated users) that are identified as being associated with "Project X".

To continue with the example, a subsequent email message 618 can be received by the first communication device, wherein the email message 618 includes information indicating that a meeting relating to "Project X" is to be scheduled for Jun. 9, 2011 at 10:00 a.m. with Fred (e.g., first user) and Tom (who requested the meeting). As disclosed herein, the EIMC 606 can analyze and/or parse the message 618 and can identify that the email message 618 relates to "Project X" and contains information indicating there is to be a meeting relating to "Project X" to be scheduled for Jun. 9, 2011, at 10:00 a.m. The EIMC 606 can generate and apply (e.g., automatically) the tag "Project X" to the email message 618, archive the message 618 in the file folder 610, and update (e.g., automatically) the project summary and/or project timeline 614 to indicate that the meeting is scheduled for Jun. 9, 2011, at 10:00 a.m. After the meeting has taken place, the EIMC 606 can update (e.g., automatically, or in response to user input received via a communication device indicating that the meeting occurred and was completed) the project summary and/or project timeline 614 to indicate that the meeting is completed.

To further continue with the example, as "Project X" related items, like the budget proposal 620 for "Project X" and the risk/benefit analysis 622 for "Project X" are drafted and stored in the file folder 610 for "Project X", the EIMC 606 can analyze these electronic documents (e.g., 620, 622), can respectively identify what the respective electronic documents are (e.g., the budget proposal 620 and the risk/benefit analysis 622), can tag the electronic documents 620 and 622 with the tag "Project X" (or the EIMC 606 can tag the electronic documents 620 and 622 when they are stored in the file folder 610), and can update (e.g., automatically) the project summary and/or project timeline 614 to indicate that these "Project X" related items have been completed.

As depicted in FIG. 6, an electronic document 624 comprising comments of the project manager (e.g., first user) has been drafted and is displayed on the display screen of the first UI component 602. Prior to storing the finalized version of the electronic document 624, the project summary and/or project timeline 614 can indicate that the budget proposal 620 and risk/benefit analysis 622 have been completed, but the comments of the project manager has not yet been completed, as shown in FIG. 6 (as shown in the second UI Component 604 (BEFORE)). When the electronic document 624 is saved and stored in the file folder 610, the EIMC 606 can analyze or parse the electronic document 624 and can identify that the electronic document 624 is related to "Project X" based at least in part on the electronic document 624 comprising the keyphrase "Project X", which matches the tag "Project X" associated with file folder 610 and/or because the electronic document 624 has been stored in the file folder 610, and can further identify that the electronic document 624 comprises comments of the project manager. Based on this analysis, the EIMC 606 can tag the electronic document 624 with the tag "Project X" (or the EIMC 606 can tag the electronic document 624 when it is stored in the file folder 610), and can update the project summary and/or project timeline 616 to indicate that the comments of the project manager have been completed, as shown in FIG. 6 (as shown in the second UI Component 604 (AFTER)).

Continuing to refer to FIG. 3 (along with FIGS. 1 and 2), in accordance with still another aspect, the EIMC 310 also can analyze and parse audio or video content to identify information associated with a tag(s). For example, the file folder 318 relating to "Project X" can have not only the tag "Project X" associated with it, but also can have the tag (e.g., sub-tag) "apparel (or clothing) with 'Project X' logo" associated therewith, because "Project X" is a brand name, which is used with regard to products, including clothing. The communication device$_1$ 302 can receive an electronic document (e.g., email) that has a video file attached to it. The EIMC 310 can analyze and/or parse the video content in the video file while the electronic document is displayed in the UI component$_1$ 306 and/or when stored in the file folder 318 and/or as accessed from the message server 312, to determine whether the video content contains any instances associated with a tag(s). If and when the EIMC 310 identifies any instances associated with a tag(s) (e.g., the tag "apparel (or clothing) with 'Project X' logo"), the EIMC 310 tag the video content in general and/or can tag the portion of the video content that comprises information relating to the tag. For example, if at 3 minutes and 10 seconds into the video content, the EIMC 310 identifies a person is wearing a shirt with the "Project X" logo on it, the EIMC 310 can generate and apply the corresponding tag(s) at the 3:10 point of the video content to facilitate directing the user to that point in the video content and/or can generate textual information that can be presented along with the video to indicate that the information relating to the tag (e.g., video scene with the person wearing a shirt with the "Project X" logo on it) is located at the 3:10 point of the video content. The EIMC 310 can store the video content and associated tag information in the file folder 318 associated with the tag "Project X" (and/or in a sub-file folder (of file folder 318) associated with the sub-tag "apparel (or clothing) with 'Project X' logo"). In an aspect, this update to the file folder 318 can be propagated to other communication devices (e.g. communication device$_2$ 304) (and associated users) associated with the group relating to "Project X", as more fully disclosed herein.

As another example, the EIMC 310 can search online sites (e.g., web pages of news web sites, social network web sites, etc.) in response to a command received from a communication device (e.g., communication device$_1$ 302), periodically, or dynamically (e.g., in response to occurrence of an event relating to a tag) and can analyze and/or parse information, such as audio content, video content and/or digital images, contained on the online sites relates to a tag stored in the data store 314, and can download a copy of an online site, or portion thereof, that contains information relating to a tag, associate (e.g., apply, attach) the related tag to the downloaded online site, and store the downloaded online site to a file folder associated with the tag.

As still another example use is tagging of audio content or visual content (e.g., video content or visual images) is with regard to news organizations (e.g., traditional news organizations, celebrity magazines, etc.). For instance, a news organization can desire to obtain, store, and correlate information, including audio or visual content, of noteworthy persons (e.g., celebrities, politicians, etc.) or subjects (e.g., politics, environment, relationships, movies, music, finance, etc.). For actor Brad Pitt, the EIMC 310 can utilize tags, such as "Brad Pitt", "Brad Pitt and Angelina Jolie", "Brad Pitt and Jennifer Aniston", actor, celebrity, movies, Hollywood, and/or other tags or sub-tags to tag content relating to Brad Pitt; and for actress Angelina Jolie, the EIMC 310 can utilize tags, such as "Angelina Jolie", "Brad Pitt and Angelina Jolie", actor or actress, celebrity, movies, Hollywood, and/or other tags or sub-tags to tag content relating to Angelina Jolie. The EIMC 310 can tag a digital photograph of Brad Pitt and Angelina Jolie downloaded from on a web site with one or more of the aforementioned tags, and the digital photograph can be stored in the respective folders associated with the respective tags. For example, that digital photograph can be tagged as "Brad Pitt and Angelina Jolie" and stored in the file folder associated with tag "Brad Pitt and Angelina Jolie", but also can be sub-tagged (or cross-tagged) as "Brad Pitt", and a copy of that digital photograph (or a corresponding alias file or link to the digital photograph file) also can be stored in a sub-file folder (or a separate file folder) associated with the tag "Brad Pitt" (e.g., within the file folder associated with the tag "Brad Pitt and Angelina Jolie").

The disclosed subject matter, by employing tagging of electronic documents (e.g., private tagging for closed user groups, public tagging) and propagation (e.g., forward, backward, laterally) of information between communication devices and/or electronic documents based at least in on the tagging of electronic documents, can facilitate desired common access to or common benefit of tagging structures, project structures, project files, etc., which can allow all permitted users (e.g., users in a user group associated with a tag) the common benefit of the contributions of other users (e.g., other permitted users) in relation to electronic documents and other information relating thereto that are associated with the tag. Further, the disclosed subject matter facilitates intelligent and efficient processing of electronic documents without the user having to manually search for a desired destination (e.g., file folder, communication device associated with a user group, a server and/or online site comprising information associated with a tag, etc.) for an electronic document or information relating thereto.

Figure 7:
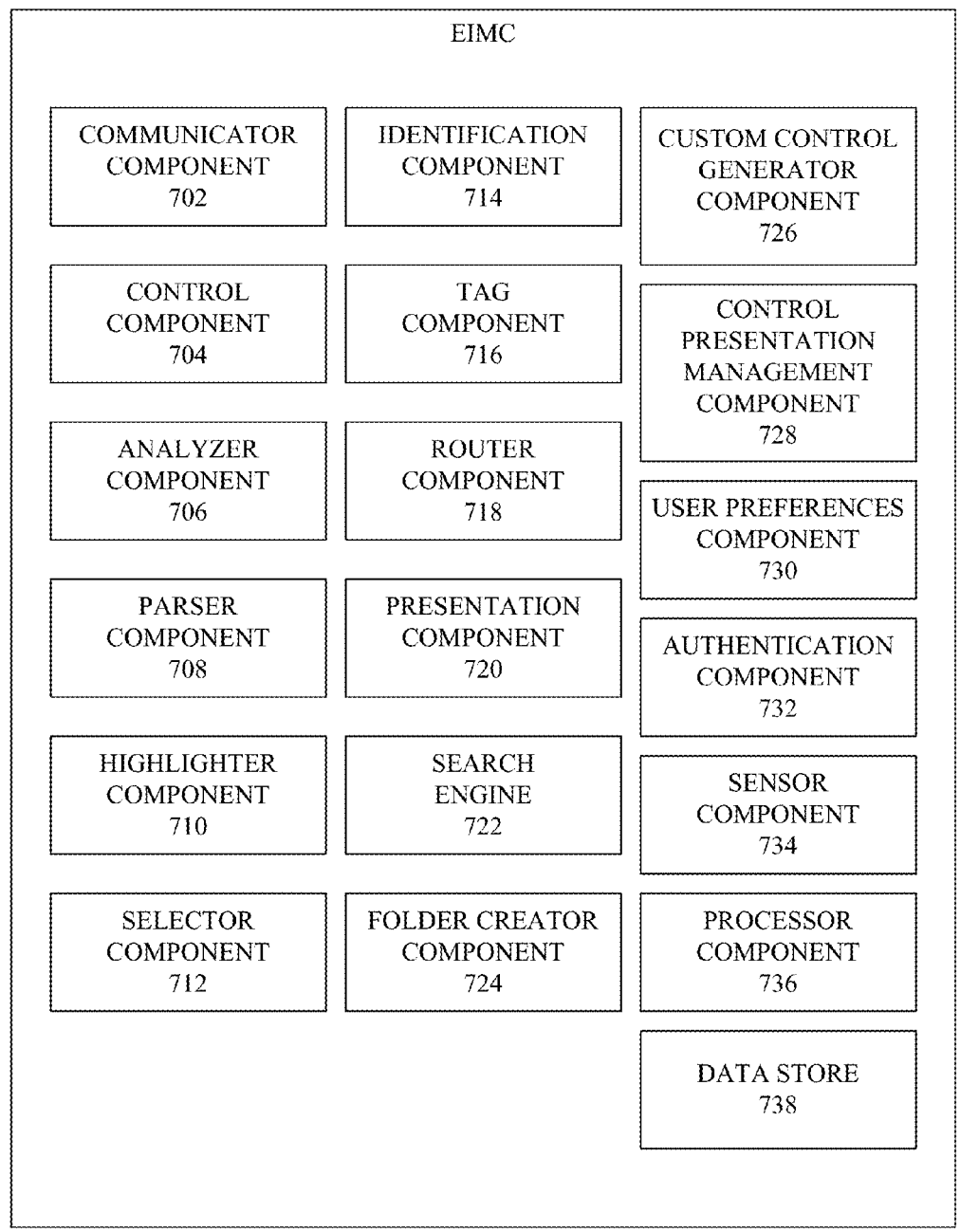
FIG. 7 depicts a block diagram of an example EIMC that can facilitate intelligent electronic document processing, document tagging, and information propagation, in accordance with various aspects and embodiments of the disclosed subject matter.

Referring to FIG. 7, depicted is a block diagram of an example EIMC 700 that can facilitate intelligent electronic document processing, document tagging, and information propagation, in accordance with various aspects and embodiments of the disclosed subject matter. In accordance with an aspect, the EIMC 700 can comprise a communicator component 702 that can facilitate communication (e.g., transmission, reception) of information between components within the EIMC 700 or communication of information between the EIMC 700 and other components (e.g., communication network, communication device, etc.) associated with the EIMC 700 via a wireline or wireless communication connection.

In another aspect, the EIMC 700 can include a control component 704 that can perform one of more control functions automatically, dynamically (e.g., in response to a detected occurrence of an event relating to a tag), or in response to selection of the one or more control functions. For example, the control component 704 can perform a respectively desired control function in response to a respectively selected control, such as, for example, an archive control, a play control, a select control, or a custom control (e.g., control created by a user), as more fully disclosed herein.

In an aspect, the EIMC 700 can comprise an analyzer component 706 that can analyze information, such as information associated with an electronic document being processed by the EIMC 700, to facilitate processing the electronic document or performing a desired action, wherein the information can comprise, for example, the sender or drafter of the electronic document, recipient of the electronic document (e.g., email or text message), subject header of an electronic document, information included in the body of an electronic document, metadata associated with an electronic document, information associated with a data store (e.g., file folder names, content stored in file folders, etc.), tag information (e.g., tag word or phrase), etc.

In still another aspect, the EIMC 700 can contain a parser component 708 that can parse information associated with an electronic message to facilitate identifying one or more items of key-content in the electronic message, a link to an online site or page, an attachment, a type of attachment, contact information, etc., to facilitate desirably processing the electronic message. For instance, the parser component 708 can operate in conjunction with the analyzer component 706 to facilitate parsing and processing an electronic document. In an aspect, to facilitate identifying an item(s) of key-content, the parser component 708 and/or analyzer component 706 (e.g., comprising a comparator component (not shown)) can evaluate or compare words, phrases, or other content identified in an electronic message, or in associated information (e.g., attached file), with a known tag(s) (e.g., stored tag word or phrase) associated with respective file folders to facilitate identifying a word, phrase or other content in or associated with the electronic message as a potential item of key-content associated with a particular file folder, wherein a word, phrase, or other identified content in or associated with the electronic message that matches, or at least substantially matches, a known tag can be, or at least potentially can be, an item of key-content associated with a desired file folder.

In yet another aspect, the EIMC 700 can comprise a highlighter component 710 that can be used to highlight or emphasize information, such as an item of key-content in or associated with an electronic document. For instance, the highlighter component 710 can highlight a word(s) or phrase(s) associated with an electronic document (e.g., differentiate the color of the display region associated with a word or phrase, or differentiate the color of the characters of the word or phrases, in relation to other words or phrases associated with the electronic document, etc.) or otherwise emphasize a word(s) or phrase(s) associated with the electronic document (e.g., emphasize by differentiating size, or emphasize by bolding a word or phrase, in relation to other words or phrases associated with the electronic document, etc.) to facilitate indicating a keyword(s) or keyphrase(s) to the user via a display region of the UI component, wherein the highlighting or emphasizing can be performed, for example, as more fully disclosed herein. With regard to audio or visual content, the highlighter component 710 can generate and apply an audio or a visual indicator to such content to indicate and/or emphasize the portion of the content that contains the key-content.

In accordance with an aspect, the EIMC 700 can include a selector component 712 that can select a control, a parameter setting, a function, an option, etc., automatically, dynamically, or in response to received input information (e.g., from a user) via a UI component (e.g., UI component). In another aspect, the EIMC 700 can contain an identification component 714 that can identify one or more items of key-content in or associated with an electronic document, or can identify one or more file folders, applications, or destinations that are associated with an item(s) of key-content, or tag. For instance, the identification component 714 can operate in conjunction with the analyzer component 706 and/or parser component 708 to facilitate identifying one or more items of key-content in or associated with an electronic document based at least in part on known file folder names or file folder content, known tags associated with a desired file folder(s), or known or inferred words or phrases that can or may be associated with a desired file folder(s). As another example, the identification component 714 also can facilitate identifying one or more file folders in which storage of the electronic document or associated information can or may be desired, identifying an application to open or access in response to a selected control or information identified in association with the electronic document, or identifying a desired destination for information associated with the electronic document, for example, based at least in part on parsing of the electronic document, selection of a control(s), information stored in the data store, tag information, etc.

In still another aspect, the EIMC 700 can include a tag component 716 that can enable a user to tag a word, phrase, or other content (e.g., via selection or highlighting of a word, phrase or other content), or create a tag, in response to received input from the user (e.g., user can manually select a tag, or user can accept an automatically identified or generated tag presented to the user), wherein the EIMC 700 can associate a desired tag with a desired file folder. The tag component 716 can facilitate storing tag-related information in a data store (e.g., data store 736).

In yet another aspect, the EIMC 700 can contain a router component 718 that can route or propagate information (e.g., electronic document, information relating to an electronic document or tag, tag, file attached to an electronic document, information associated with a link, etc.) to a desired destination (e.g., desired file folder, desired communication device, etc.) to facilitate desired electronic document processing (e.g., automatically, dynamically, or in response to selection of one or more UI controls associated with the UI component). The router component 718 can receive or generate routing information (e.g., destination address, communication device identifier, etc.) to facilitate routing or propagating the information.

In accordance with still another aspect, the EIMC 700 can include a presentation component 720 that can identify a desired arrangement of the UI display screen or desired presentation of electronic items and information on the UI display screen of a UI component based at least in part on the predefined document processing criteria and user preferences. For example, the presentation component 720 can facilitate presenting information, such as information in an electronic document, on the UI display screen with a portion(s) of such information highlighted or emphasized to show potential key-content or other items of potential interest. As another example, the presentation component 720 can facilitate modifying the presentation of information and electronic items on the UI display screen associated with a communication device, for example, when information has been propagated to the communication device. As still another example, the presentation component 720 can facilitate presenting a subset of UI controls on the UI display screen, wherein the subset of UI controls can be used by a user to facilitate intelligent document processing, as more fully described herein.

In accordance with still another aspect, the EIMC 700 can include a search engine 722 that can search the data store 736, online sites (e.g., social networking web sites), servers, etc., to facilitate identifying electronic documents that comprise items of interest (e.g., key-content or at least potential key-content) based at least in part on a tag(s). The search engine 722 can directly perform the search itself and/or can employ a general search engine (e.g., an online search engine) to facilitate searching for items of interest. For example, if the tag component 716 tags an electronic document with a specified tag, the search engine can search the data store 736, online sites, servers or other communication devices to try to locate and identify other electronic documents that comprise information relating to the specified tag, wherein, for example, the search engine 722 can use the same word or phrase in the tag and/or other words or phrases relating to the specified tag as search terms when performing the search.

In an aspect, the EIMC 700 can comprise a folder creator component 724 that can create a file folder when desired, such as, for example, when an electronic document is associated with a new matter that does not already have a file folder. A newly created file folder can be stored in a desired location in a data store, for example. In an aspect, the folder creator component 724 or another component associated therewith (e.g., another component of the EIMC 700) can identify or infer a desired location of the newly created file folder to facilitate eliminating or at least reducing the amount of time and number of actions taken to store the newly created file folder in the desired location in the data store or other desired destination, wherein the electronic document or associated information can be stored within the newly created file folder. For example, if a new file folder is being created for an established client (e.g., "Adams") for a new matter for that client, the folder creator component 724 or other component(s) of the EIMC 700 (e.g., analyzer component 706, parser component 708, identification component 714, etc.) can identify a sub-directory (e.g., "Client: Adams") in the data store comprising one or more file folders associated with that client, and can automatically present the sub-directory to the user via the UI component, and the user can select the identified sub-directory if that is the sub-directory desired by the user, which can allow the user to select the identified sub-directory without having to search for and locate the desired sub-directory, or can allow the user to search for and select another desired sub-directory in which to store the new file folder.

In still another aspect, the EIMC 700 can include a custom control generator component (CCGC) 726 that can facilitate enabling a user to create a desired custom message processing control to facilitate desired electronic document processing of messages. The CCGC 726 can receive desired control settings from a user, wherein the desired control settings can be used to facilitate enabling the custom electronic document processing control to perform the desired functions to desirably process an electronic message. For instance, the control settings can relate to an application(s) to be opened or used when the custom electronic document processing control is selected or activated, control parameter setting values for control parameters relating to the custom electronic document processing control, destination of the electronic document or portion thereof (e.g., destination, such as storage in a file folder, storage in a remote storage location associated with a TV, communication device or email address to which the electronic document or information relating thereto is to be propagated, etc.), etc.

In an aspect, the EIMC 700 can include a control presentation management component (CPMC) 728 that can manage (e.g., dynamically control) presentation or display of one or more controls based at least in part on available display space for presenting controls, user preferences, current or historical information relating to user activity with regard to respective controls, electronic documents, and information (e.g., attached files to an electronic document(s), hyperlinks associated with an electronic document(s), etc.) associated with electronic documents, etc. In another aspect, the CPMC 728 also can dynamically control the location, size, and/or emphasis of electronic document processing controls on the display screen. For example, if the CPMC 728 determines or infers that a certain subset of electronic document processing controls is more likely to be used to process the electronic document as compared to another subset of electronic document processing controls, the CPMC 728 can dynamically display the certain subset of electronic document processing controls such that the electronic document processing controls in the certain subset are displayed on the display screen in a more convenient region of the display screen, the electronic document processing controls in the certain subset can be displayed with a larger size than other electronic document processing controls, and/or the electronic document processing controls in the certain subset can be displayed with more emphasis (e.g., highlighted with a different color) than other electronic document processing controls.

In another aspect, the EIMC 700 can comprise a user preferences component 730 that can enable a user to provide and set desired user preferences (e.g., via one or more menus of available user preferences relating to electronic document processing) or default user preferences to facilitate enabling the user to select (e.g., using the communication device associated with the EIMC 700) desired user preferences in relation to the electronic document processing. The user preferences component 730 can facilitate storing the respective set of user preferences of a respective user in a respective user file of the user, wherein the user file can be stored, for example, in the data store 734. The user preferences can relate, for example, to the number or type of electronic document processing controls to display with a particular electronic document, the sizes of respective display regions of a display screen, and/or the type of highlighting or emphasis to be used for keywords, keyphrases, links, etc.

In still another aspect, the EIMC can comprise an authentication component 732 that can authenticate users, such as users associated with a user group, and control granting of access rights to a user based at least in part on authentication credentials (e.g., password, passphrase, personal identification number (PIN), biometric authentication information (e.g., fingerprint, retina scan information, facial recognition information), communication device identifier, etc.) respectively associated with users or other entities (e.g., communication devices). For instance, the authentication component 732 can control access by a user to information associated with a tag so that the user is not able to access any, or at least a portion, of the information associated with the tag unless the user provides proper authentication credentials to the authentication component 732 via a communication device.

In an aspect, the authentication component 732 can compare received authentication credentials with stored authentication credentials respectively associated with users to determine whether the received authentication credentials match any of the stored authentication credentials. If the received authentication credentials match a stored set of authentication credentials, the user and associated communication device can be granted access rights to a subset of information controlled by the EIMC 700 (e.g., information stored in the data store 736), wherein the subset of information to which the user is granted access can be identified in accordance with the granted access rights. If the received authentication credentials do not match a stored set of authentication credentials, the authentication component 732 can deny a user access to all, or at least a portion, of information controlled by the EIMC 700. In another aspect, the authentication component 732 also can generate, maintain, or modify a mapping of authentication credentials of respective users to respective tags, user groups, subject matter, communication devices, electronic documents, etc., to facilitate identifying access rights, and information to which a user can be granted access in accord with the user's access rights.

In accordance with yet another aspect, the EIMC 700 can include a sensor component 734 that can employ or interact with (e.g., communicate with) a specified number of audio sensors or video sensors to facilitate parsing audio or video content. An audio sensor can sense or analyze audio content in or associated with an electronic document or item (e.g., song file or streaming audio, video file or video streaming, etc.) to identify words, musical notes, events, voice recognition of people, etc., contained in the audio content. A video sensor can sense or analyze video content in or associated with an electronic document or item to identify words, people (e.g., visual recognition of people), colors, events, visual or physical features, etc., contained in the video content.

The EIMC 700 also can comprise a processor component 736 that can operate in conjunction with the other components (e.g., communicator component 702, control component 704, parser component 706, highlighter component 708, etc.) to facilitate performing the various functions of the EIMC 700. The processor component 736 can employ one or more processors, microprocessors, or controllers that can process data, such as information relating to messages (e.g., information relating to processing of messages, such as disclosed herein), information relating to other operations of the EIMC 700, and/or other information, etc., to facilitate operation of the EIMC 700, as more fully disclosed herein, and control data flow between the EIMC 700 and other components (e.g., UI component, data store 738, communication devices, etc.) associated with the EIMC 700.

The EIMC 700 also can include a data store 738 that can store data structures (e.g., user data, metadata), code structure(s) (e.g., modules, objects, hashes, classes, procedures) or instructions, information relating to electronic documents (e.g., information relating to processing of electronic documents, such as disclosed herein), information relating to other operations of the EIMC 700, etc., to facilitate controlling operations associated with the EIMC 700. In an aspect, the processor component 736 can be functionally coupled (e.g., through a memory bus) to the data store 738 in order to store and retrieve information desired to operate and/or confer functionality, at least in part, to the components of the EIMC 700 (e.g., communicator component 702, control component 704, parser component 706, highlighter component 708, etc.), and/or substantially any other operational aspects of the EIMC 700.

Figure 8:
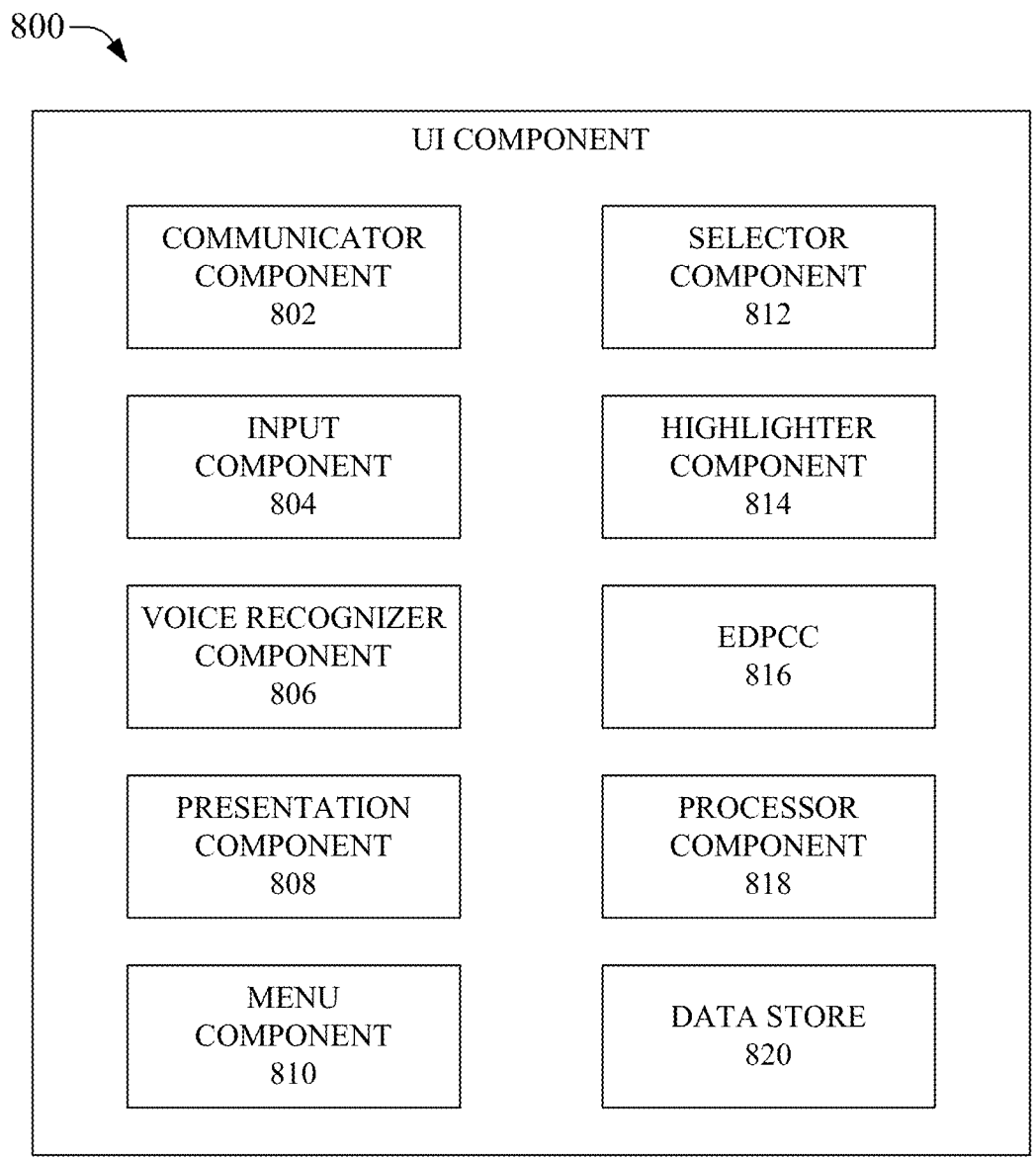
FIG. 8 presents a block diagram of an example UI component that can facilitate intelligent electronic document processing in accordance with various aspects and embodiments of the disclosed subject matter.

FIG. 8 depicts a block diagram of an example UI component 800 that can facilitate intelligent electronic document processing in accordance with various aspects and embodiments of the disclosed subject matter. In an aspect, the UI component 800 can comprise a communicator component 802 that can be employed to facilitate communications (e.g., transmission or receptions of information) between the UI component 800 and other components (e.g., EIMC, message server, processor component, data store, etc.) associated with the UI component 800.

In another aspect, the UI component 800 can include an input component 804 that can comprise one or more UIs (e.g., keyboard, mouse, trackpad, touch screen, microphone, etc.) that can receive input from a user to facilitate performing desired actions, such as processing of electronic documents. For instance, the user can enter desired information using the one or more UIs to facilitate selecting electronic document processing controls, items of key-content, file folders, or commands, etc. In still another aspect, the UI component 800 can contain a voice recognizer component 806 that can operate in conjunction with the input component 804 to receive voice input, such as voice commands, and the voice recognizer component 806 can convert the received voice input into corresponding commands, such as electronic document processing commands relating to corresponding electronic document processing controls (e.g., archive control, select control, etc.), selection of items of key-content, selection of file folders, and/or other desired actions relating to processing information (e.g., processing electronic documents).

In an aspect, the UI component 800 also can include a presentation component 808 that can provide one or more output interfaces (e.g., display screens, display regions on a display screen, speakers, etc.) that can present (e.g., display) information to the user. For instance, the presentation component 808 can display one or more electronic documents to the user, one or more electronic document processing controls, one or more menus, a keyboard (e.g., on a touch screen display), etc.

In yet another aspect, the UI component 800 can include a menu component 810 that can generate and/or display one or more menus that respectively contain one or more selectable options available to the user to facilitate processing electronic documents, selecting user preferences, arranging or organizing a UI display screen in a subject-oriented (e.g., project-oriented) manner, creating custom electronic document processing controls, and/or other aspects or functions relating to electronic document processing. In still another aspect, the UI component 800 can comprise a selector component 812 that can facilitate selection of a desired option, preference, button, control, or function, etc., in response to received input from the user (e.g., input received via the input component 804).

In an aspect, the UI component 800 can contain a highlighter component 814 that can be used to facilitate highlighting or emphasizing information (e.g., used to display highlighted or emphasized information; used to highlight or emphasize a piece of information in response to received input indicating that highlighting or emphasis of the piece of information is desired (e.g., by the user, by the EIMC)), such as an item of key-content in or associated with an electronic document. For instance, the highlighter component 814 can highlight a word(s), phrase(s) or other content associated with an electronic document (e.g., differentiate the color of the display region associated with a word or phrase, or differentiate the color of the characters of the word or phrases, in relation to other words or phrases associated with the electronic document, etc.) or otherwise emphasize a word(s), phrase(s) or other content associated with the electronic document (e.g., emphasize by differentiating size, or emphasize by bolding a word or phrase, in relation to other words or phrases associated with the electronic document, etc.) to facilitate indicating an item(s) of key-content to the user via a display region of the UI component 800, wherein the highlighting or emphasizing can be performed, for example, as more fully disclosed herein.

In an aspect, the UI component 800 can comprise an electronic document processing control component (EDPCC) 816 that can be employed to facilitate display of one or more electronic document processing controls via a display screen of the presentation component 808, wherein the electronic document processing controls can be selected by a user, as desired, to facilitate intelligently processing electronic documents. In accordance with various aspects, the electronic documents processing controls, or a portion thereof, can be displayed in a dedicated region of a display screen, in one or more menus, and/or displayed in an area of the display screen proximate to an electronic document item with which a particular electronic document processing control can or may be desired (e.g., alternatively or in addition to displaying the archive control in a region of the display screen dedicated to displaying electronic document processing controls, the archive control can be displayed near a highlighted item of key-content and/or can appear on the display when the cursor (e.g., cursor, arrow icon, hand icon, etc.) hovers over the keyword or when the user selects (e.g., clicks on) the keyword).

The UI component 800 also can comprise a processor component 818 that can work in conjunction with the other components (e.g., communicator component 802, input component 804, voice recognizer component 806, presentation component 808, etc.) to facilitate performing the various functions of the UI component 800. The processor component 818 can employ one or more processors, microprocessors, or controllers that can process data, such as information relating to electronic document processing, managing communications between various components associated with the UI component 800, information relating to other operations of the UI component 800, and/or other information, etc., to facilitate operation of the UI component 800, as more fully disclosed herein, and control data flow between the UI component 800 and other components (e.g., EIMC, servers, data store, etc.) associated with the UI component 800.

The UI component 800 also can include a data store 820 that can store data structures (e.g., user data, metadata), code structure(s) (e.g., modules, objects, hashes, classes, procedures) or instructions, information relating to processing of electronic documents, managing communications between various components associated with the UI component 800, information relating to other operations of the UI component 800, etc., to facilitate controlling operations associated with the UI component 800. In an aspect, the processor component 818 can be functionally coupled (e.g., through a memory bus) to the data store 820 in order to store and retrieve information desired to operate and/or confer functionality, at least in part, to the components of the UI component 800 (e.g., communicator component 802, input component 804, voice recognizer component 806, presentation component 808, etc.), and/or substantially any other operational aspects of the UI component 800.

Figure 9:
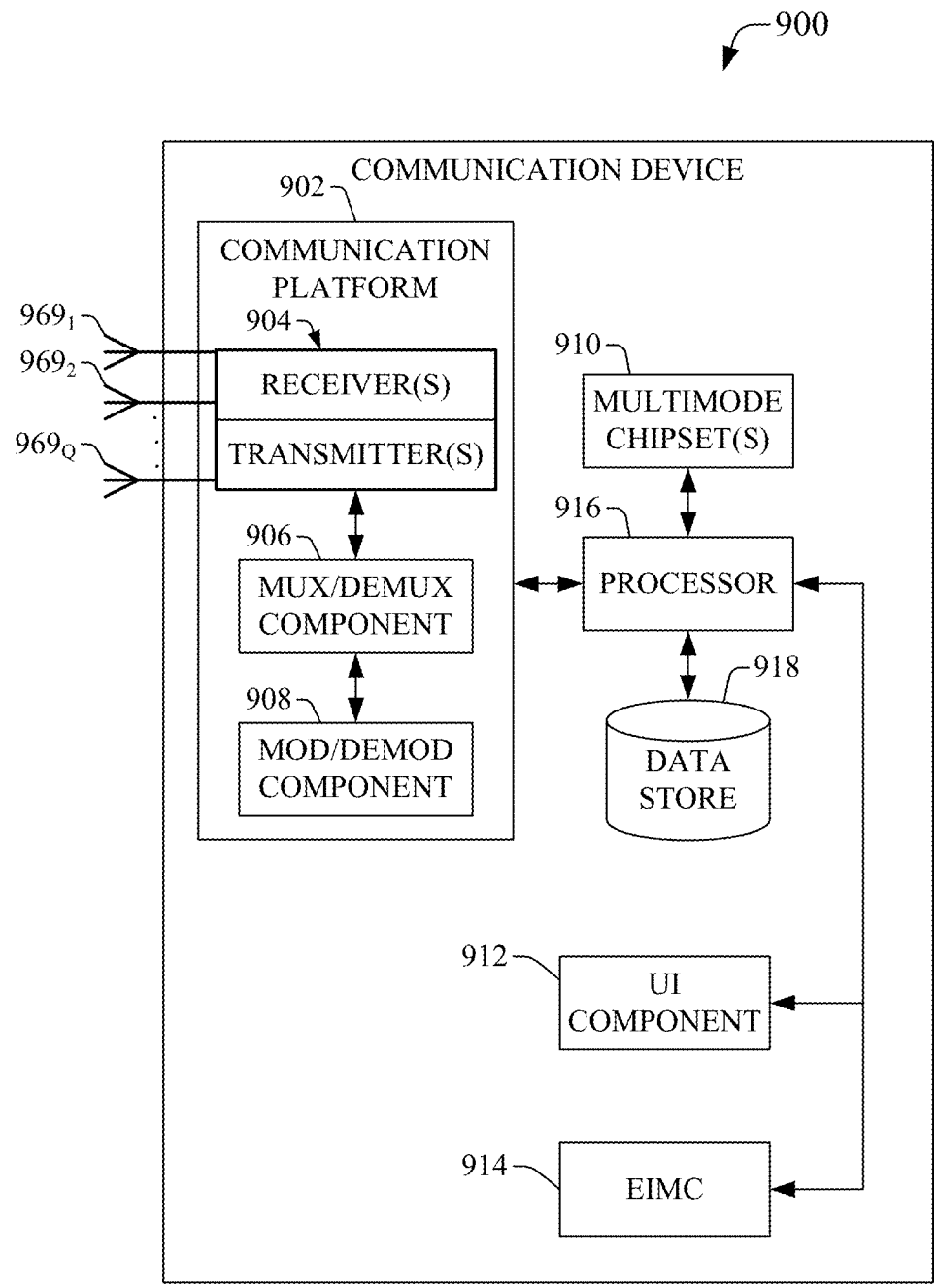
FIG. 9 illustrates a block diagram of an example communication device that can be employed to facilitate intelligent electronic document processing in accordance with various aspects and embodiments of the disclosed subject matter.

FIG. 9 depicts a block diagram of an example communication device 900 (e.g., computer, mobile communication device, etc.) that can be employed to facilitate intelligent electronic document processing in accordance with various aspects and embodiments of the disclosed subject matter. In an aspect, the communication device 600 (e.g., computer, laptop computer, mobile phone, smart phone, landline phone with messaging capabilities, electronic notebook or notepad, electronic reading device, electronic gaming device, STB, etc.) can include a communication platform 902 that can comprise electronic components and associated circuitry that can provide for processing and manipulation of a received signal(s) or signal(s) to be transmitted, for example, via a wireline or wireless communication connection. In accordance with various embodiments, the communication device 900 can be employed to facilitate wireless communication with other communication devices, wherein the communication device 900 can be a multimode access terminal, wherein a set of antennas $969_1$-$969_Q$ (Q is a positive integer) can receive and transmit signal(s) from and to wireless devices like access points, access terminals, wireless ports and routers, and so forth, that operate in a radio access network. It should be appreciated that antennas $969_1$-$969_Q$ are a part of the communication platform 902, which can comprise electronic components and associated circuitry that provide for processing and manipulation of received signal(s) and signal(s) to be transmitted, such as, for example, receivers and transmitters 904, multiplexer/demultiplexer (mux/demux) component 906, and modulation/demodulation (mod/demod) component 908. It is to be appreciated and understood that, while communication device 900 is depicted as being capable of communicating via a wireline or wireless communication connection, as desired, in accordance with various embodiments, the communication device 900 also can be configured to be capable or communicating via one of a wireline communication connection (e.g., a computer, such as a personal computer, connected via a wireline communication connection (e.g., digital subscriber line (DSL) connection)) or a wireless communication connection (e.g., a cellular or smart phone connected via a cellular or Wi-Fi communication connection).

In another aspect, the communication device 900 can include a multimode operation chipset(s) 910 that can allow the communication device 900 to operate in multiple communication modes in accordance with disparate technical specification for wireless technologies. In an aspect, multimode operation chipset(s) 910 can utilize communication platform 902 in accordance with a specific mode of operation (e.g., voice, GPS, etc.). In another aspect, multimode operation chipset(s) 910 can be scheduled to operate concurrently (e.g., when Q>1) in various modes or within a multitask paradigm.

In still another aspect, the communication device 900 can contain a UI component 912, which can comprise one or more interfaces (e.g., display screens, touch screens, buttons, controls, switches, adapters, connectors, speakers, etc.) that can be utilized to perform and/or can facilitate intelligent electronic document processing, as more fully disclosed herein. In yet another aspect, the communication device 900 can comprise an EIMC 914 that can be associated with the UI component 912, wherein the EIMC 914 can perform and/or can facilitate intelligent electronic document processing, as more fully disclosed herein.

In an aspect, the communication device 900 also can include a processor(s) 916 that can be configured to confer functionality, at least in part, to substantially any electronic component within the communication device 900, in accordance with aspects of the disclosed subject matter. For example, the processor(s) 916 can facilitate enabling the communication device 900 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 916 can facilitate enabling the communication device 900 to process data relating to electronic documents (e.g., intelligent processing of electronic documents), voice calls, or other applications or services.

The communication device 900 also can contain a data store 918 that can store data structures (e.g., user data, metadata); code structure(s) (e.g., modules, objects, classes, procedures) or instructions; message hashes; neighbor cell list; one or more lists (e.g., whitelist, etc.); information relating to configuring the communication device 900 (e.g., UI component 912, EIMC 914) to intelligently process electronic documents, as more fully disclosed herein; voice calls, electronic documents, or other applications or services associated with the communication device 900; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 916 can be functionally coupled (e.g., through a memory bus) to the data store 918 in order to store and retrieve information (e.g., neighbor cell list; information relating to electronic documents (e.g., intelligent electronic document processing), voice calls, or other applications or services; frequency offsets; desired algorithms; security code; communication device identifier; etc.) desired to operate and/or confer functionality, at least in part, to communication platform 902, multimode operation chipset(s) 910, UI component 912, EIMC 914, and/or substantially any other operational aspects of the communication device 900.

In accordance with an embodiment of the disclosed subject matter, a design platform (not shown), for example, comprising an application programming interface(s) (API) (not shown), can be employed to enable application developers to develop additional customized electronic document processing controls. For instance, an API can be utilized to create one or more desired custom electronic document processing controls that can be employed to facilitate electronic document processing (e.g., intelligent electronic document processing of electronic documents), wherein custom electronic document processing controls created using an API can be made available to communication device users via a desired format, such as a saved or downloadable file, CD-ROM, DVD-ROM, memory stick (e.g., flash memory stick), floppy disk, etc.

In accordance with another embodiment of the disclosed subject matter, one or more components (e.g., communication device, EIMC, UI component, etc.) in the communication network environment can utilize artificial intelligence (AI) techniques or methods to infer (e.g., reason and draw a conclusion based at least in part on a set of metrics, arguments, or known outcomes in controlled scenarios) an automated response to perform in response to an inference(s); an item(s) of key-content in an electronic document that can or may relate to a tag or file folder; a file folder(s) that can or may be desired for storage of an electronic document; propagation of information relating to an electronic document from one communication device to another communication device or electronic component (e.g., data store); an application to be utilized or opened in relation to a file attached to an electronic document; a desired destination (e.g., remote storage location) for an electronic document or associated information (e.g., attached video file); a subset of electronic document processing controls to display to a user in a UI (e.g., display screen of the UI component); etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methods for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methods, fuzzy logic methods can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless, wired, and converged (e.g., wireless and wired) communication networks. For example, the disclosed subject matter can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be better appreciated with reference to flowcharts in FIGS. 10-13. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 10:
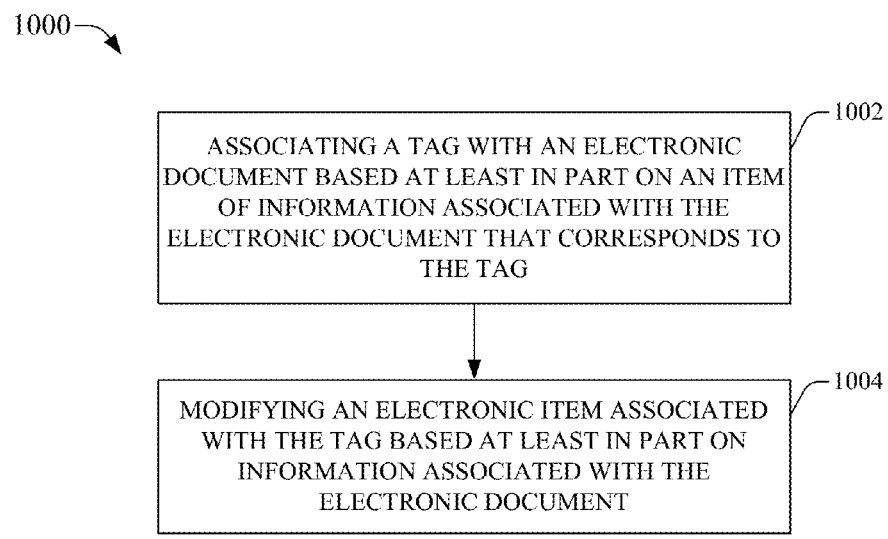
FIG. 10 depicts a flowchart of an example method that can intelligently process an electronic document in accordance with various aspects and embodiments of the disclosed subject matter.

FIG. 10 presents a flowchart of an example method 1000 that can intelligently process an electronic document in accordance with various aspects and embodiments of the disclosed subject matter. At 1002, a tag can be associated with an electronic document based at least in part on an item of information (e.g., an item of key-content) associated with the electronic document that corresponds to the tag. In an aspect, the EIMC can analyze or parse (e.g., automatically or dynamically, or in response to a manual command from a user) an electronic document (e.g., email message, text message, word processing document, audio content, video content, etc.), which is, for example, displayed on a display screen of a UI component of a communication device and/or stored on a server or in a data store. For instance, the EIMC can analyze or parse the content (e.g., text, audio or video content, etc.) in the body, subject header information, metadata, attachments, etc., associated with the electronic document in relation to stored tags (e.g., tag words, tag phrases) to determine whether an item of information associated with the electronic document is related to (e.g., matches or substantially matches) a tag(s). Based at least in part on the analysis and/or parsing, the EIMC can identify an item of information and/or a subset of potential items of information that relate to a tag(s). If the EIMC identifies an item of information that relates to a tag, or if a user uses the UI component to select an item of information (e.g., to associate the item with a tag, or to generate a tag to be associated with the item), the EIMC can associate (e.g., apply, attach, link, etc.) the tag with the electronic document.

At 1004, an electronic item associated with the tag can be modified based at least in part on information associated with the electronic document. The electronic item can be or can comprise another electronic document, a file folder, a portion of a display screen of a UI component of a communication device, etc. For instance, the EIMC can modify the UI display screen of the communication device, and/or propagate information relating to the electronic document to a second communication device (e.g., communication device associated with a same group as the first communication device, user associated with the first communication device, tag, file folder associated with the tag, project or subject matter associated with the tag, etc.) to modify a second UI display screen of the second communication device, based at least in part on information contained in the electronic document, the tag(s), respective user preferences of users respectively associated with the first communication device and second communication device, and/or the predefined document processing criteria (and corresponding predefined document processing rules).

As another example, the EIMC can propagate information relating to the electronic document to one or more other electronic documents to modify and/or tag those electronic documents based at least in part on information contained in the electronic document, the tag(s), respective user preferences of users respectively associated with the first communication device and second communication device, and/or the predefined document processing criteria. For instance, the EIMC can search the data store, a message server, online web pages, etc., to identify one or more other electronic documents that are to be tagged or modified based at least in part on the tag associated with the electronic document and/or information contained in that electronic document.

Figure 11:
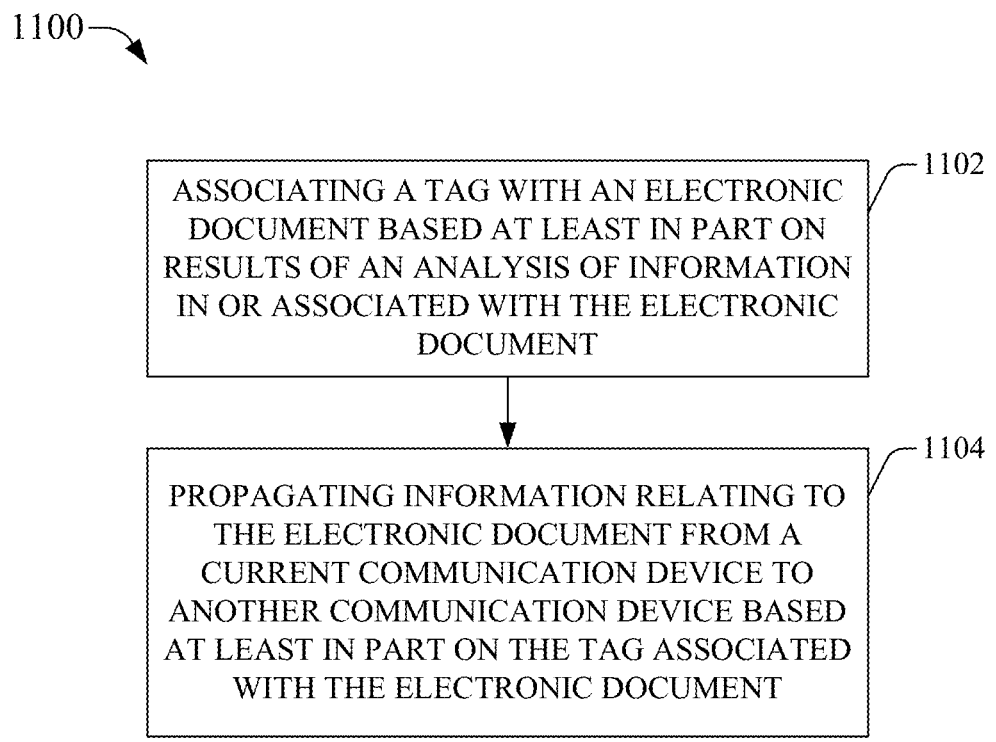
FIG. 11 illustrates a flowchart of an example method that can intelligently propagate (e.g., forward, backward) information relating to an electronic document in accordance with various aspects and embodiments of the disclosed subject matter.

FIG. 11 depicts a diagram of a flowchart of an example method 1100 that can intelligently propagate (e.g., forward, backward) information relating to an electronic document in accordance with various aspects and embodiments of the disclosed subject matter. At 1102, a tag can be associated with an electronic document based at least in part on results of an analysis of information in or associated with the electronic document. For instance, the EIMC can analyze and/or parse information in or associated with the electronic document and can associate (e.g., apply, attach, link, etc.) a tag with the electronic document based at least in part on the analysis results, in accordance with the predefined document processing criteria and/or user preferences, as more fully described herein.

At 1104, information relating to the electronic document can be propagated from a current communication device to another communication device based at least in part on the tag associated with the electronic document. In accordance with various aspects, the EIMC can propagate or transmit information relating to the electronic document from a current communication device (e.g., wherein the electronic document was analyzed) to a second communication device, in accordance with the predefined document processing criteria and respective user preferences associated with the current and second communication devices. The second communication device can be associated with another user associated with the user of the current communication device (e.g., the other user can be part of the same work group as the user), wherein, for example, information displayed on the UI display screen of the second communication device or another electronic item associated with the second communication device can be modified based at least in part on the propagated information relating to the electronic document.

As another example, the second communication device can be a server (e.g., server associated with a web site, such as a social networking web site; a message server; etc.) that contains information relating to the tag (e.g., information displayed on a web page) associated with the electronic document, wherein the EIMC previously can have information indicating the server comprises information relating to the tag or the EIMC can perform a search via a search engine (e.g., search engine that is part of the EIMC, or a general online search engine) to identify online sites, such as an online site associated with the server, that comprise information relating to the tag, wherein such identified online sites can be tagged with the tag as well. The EIMC can propagate information relating to the electronic document to the server based at least in part on identifying that the tag associated with the electronic document is the same as, or substantially the same as, or is associated with (e.g., linked to) the tag associated with the information stored on the server, and/or wherein information displayed on the UI display screen of the server or another electronic item associated with the server can be modified based at least in part on the propagated information relating to the electronic document. In another aspect, the EIMC also can retrieve information, such as web pages, tagged as a result of the search, wherein the retrieved information can be stored in the file folder associated with the tag.

As yet another example, in accordance with the method 1200, propagating information relating to the electronic document can involve the EIMC searching the data store or a message server to identify other electronic documents or items that comprise information relating or corresponding to the tag associated with the electronic document and the identified other electronic documents or items can be tagged with the tag and stored in the file folder associated with the tag. One instance where this can occur is where the file folder associated with the tag is a newly created file folder, and the other electronic documents were previously stored in the data store or one the message server, but had not yet been analyzed and/or tagged by the EIMC (e.g., user chose not to have EIMC tag a particular electronic document; particular document imported and stored in the data store without being analyzed or tagged by the EIMC; etc.)

Figure 12:
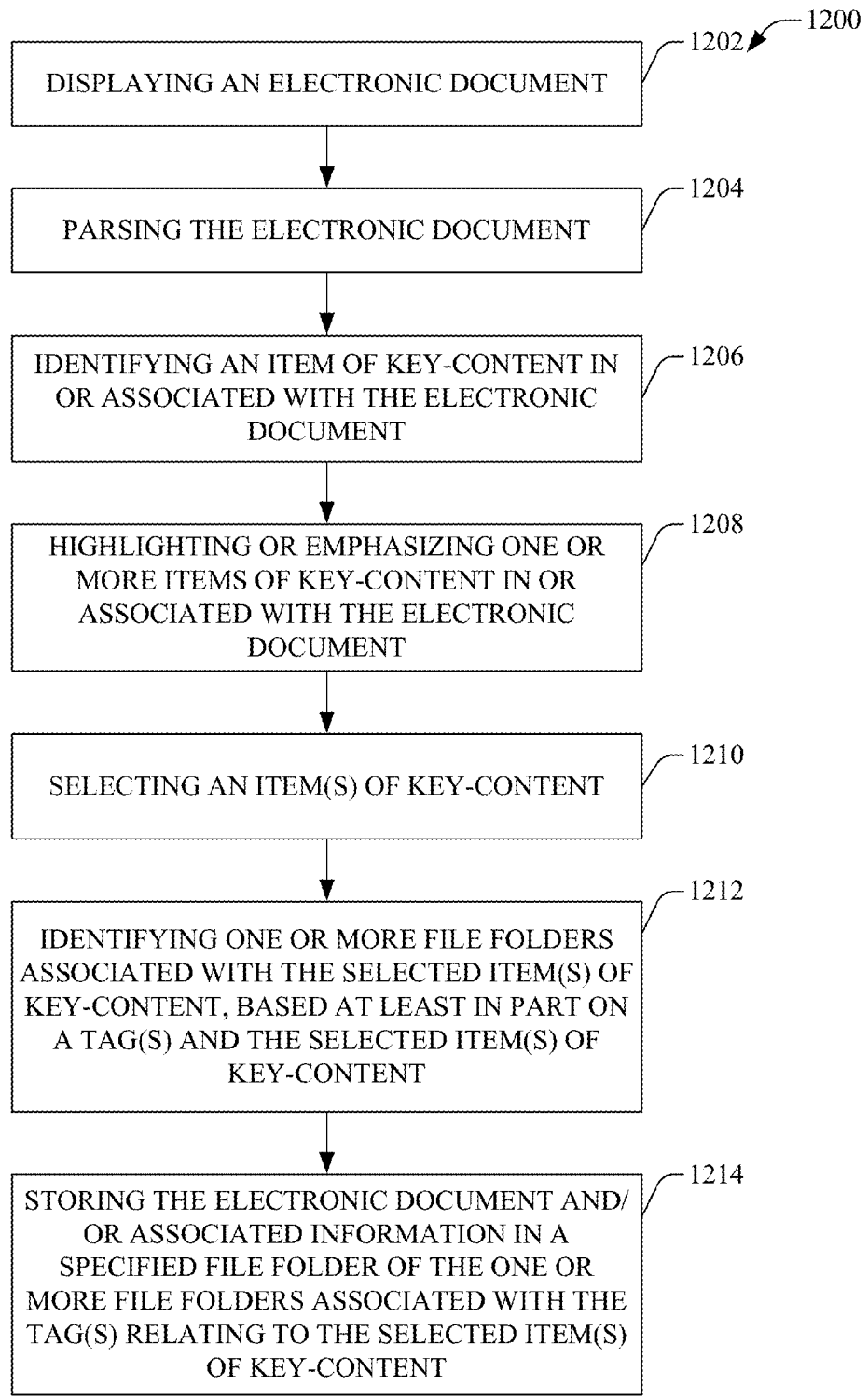
FIG. 12 depicts a flowchart of an example method that can intelligently process, tag, and archive electronic documents in accordance with various aspects and embodiments of the disclosed subject matter.

FIG. 12 presents a diagram of a flowchart of an example method 1200 that can intelligently process, tag, and archive electronic documents in accordance with various aspects and embodiments of the disclosed subject matter. In accordance with the method 1200, an electronic document displayed on the display screen of a UI component can be associated with a tag and archived in a file folder associated with that tag automatically, dynamically (e.g., in response to tagging of another electronic document, which is propagated to trigger tagging of this electronic document, as more fully described herein), or in response to as little as one UI control manipulation (e.g., mouse click) by a user.

At 1202, an electronic document can be displayed, for example, in a desired interface (e.g., display screen of the UI component). The electronic document can be an electronic document received by a communication device or an electronic document that is to be or has been sent from the communication device.

At 1204, the electronic document can be parsed. In an aspect, the EIMC can parse the electronic document to identify a potential item(s) of key-content (e.g., keyword, key-phrase, key portion of audio or video content), an attachment(s), a link to an online page or site, etc. For instance, the EIMC can scan, analyze, and/or parse the electronic document to detect or identify items of interest, such as an item(s) of key-content, date, time, persons of interest, subject matter, attachments, links, etc., wherein the type or level of parsing performed can be based at least in part on predefined document processing criteria, user preferences, an electronic document processing control being applied to the electronic document (e.g., employing an electronic document processing control that desires identification of a keyword that is or may be associated with a tag and/or file folder in the data store, but does not require identification of attachments, can result in the electronic document being parsed to identify any instances of a keyword(s), but not parsed to identify attachments; employing an electronic document processing control that desires identification of an attached file, but does not require identification of a keyword, can result in the electronic document being parsed to identify any attached files, but not parsed to identify keywords).

At 1206, an item(s) of key-content in or associated with the electronic document can be identified. In an aspect, the EIMC can identify an item(s) of key-content that is or may be associated with a tag(s) and/or a file folder stored in the data store (e.g., a word or phrase that is tagged to associate it with a particular file folder). For instance, the EIMC can compare words, phrases, or other information in or associated with the electronic document to known tags (e.g., stored tag words, tag phrases, or tag objects) respectively associated with a file folder or group of file folders stored in the data store (e.g., a subset of file folders associated with the same client or same subject matter) to determine or identify whether any words, phrases, or other information match any of the known tags, wherein a word(s), phrase(s), or content that matches a tag(s) can or may be identified as an item(s) of key-content in accordance with the predefined document processing criteria, and wherein the words, phrases, or other information can comprise of, for example, alphanumeric characters or objects.

At 1208, one or more item(s) of key-content in or associated with the electronic document can be highlighted or emphasized. In an aspect, the one or more identified items of key-content can be highlighted or emphasized, as compared to other words, phrases or other information, in the electronic document, so that the item(s) of key-content can be readily distinguished from the other information in the electronic document. At 1210, an item(s) of key-content can be selected (e.g., automatically or in response to user input). For example, the user can use desired interface controls, buttons, etc., of the UI component to select a desired item(s) of key-content in the electronic document, wherein information relating to such selection can be received by the EIMC, and/or the EIMC can automatically select an item(s) of key-content based at least in part on the predefined document processing criteria and known tags (e.g., stored tags).

At 1212, one or more file folders associated with the selected item(s) of key-content can be identified, based at least in part on a tag(s) and the selected item(s) of key-content. In an aspect, the EIMC can identify one or more file folders associated with the selected item(s) of key-content based at least in part on a tag(s) associated with the file folder(s). The one or more file folders can be presented (e.g., displayed), via the display screen of the UI component, to the user. As desired, if there is only one file folder that is associated with the selected item of key-content, it is not necessary to present the file folder via the display screen to the user, and the electronic document and/or associated information can be stored in the file folder, for example, as described with regard to act 1214.

At 1214, the electronic document and/or associated information (e.g., attached electronic documents, hyperlink(s), etc.) can be stored in a specified file folder of the one or more file folders associated with the tag(s) relating to the selected item(s) of key-content. In an aspect, if only one file folder is associated with the selected item of key-content (e.g., if only one file folder is associated with a tag that matches or is associated with the selected item of key-content), the EIMC can store the electronic document and/or associated information in that file folder in the data store, without the user having to search and locate that file folder in the file directory. If there is more than one file folder that is associated with the selected item of key-content, the subset of file folders can be presented via the display screen of the UI component to the user, and the user can enter input via the UI component to select the desired file folder from the presented subset of file folders. In response to the selection of a desired file folder, the EIMC can store the electronic document and/or associated information in the desired (e.g., selected) file folder.

Figure 13:
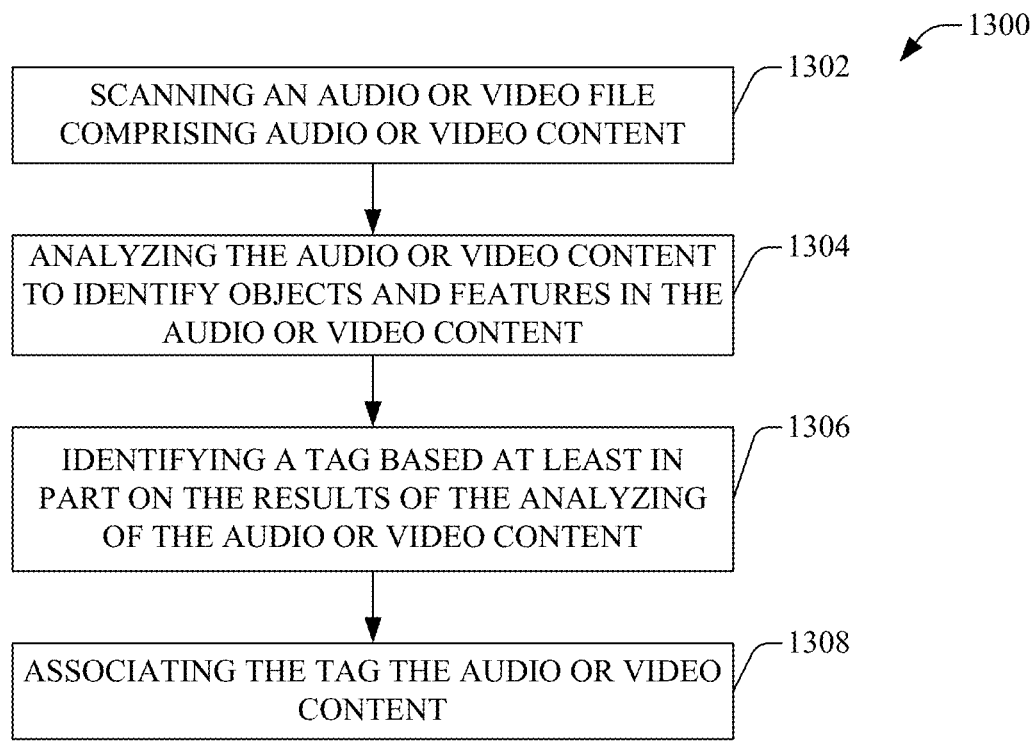
FIG. 13 illustrates a flowchart of an example method that can analyze and tag audio or video content in accordance with various aspects and embodiments of the disclosed subject matter.

FIG. 13 illustrates a diagram of a flowchart of an example method 1300 that can analyze and tag audio or video content in accordance with various aspects and embodiments of the disclosed subject matter. At 1302, an audio or video file comprising audio or video content can be scanned. At 1304, the audio or video content can be analyzed to identify objects (e.g., face, arm, shirt, pants, chair, car, word, song, note, musical instrument, etc.) and features (e.g., color of an object, texture of an object, size of an object, etc.) in the audio or video content. In accordance with various aspects, the EIMC can employ audio or video sensors, facial recognition techniques, etc., to facilitate scanning, sensing, and analyzing the content to identify the objects and features, for example, in relation to a tag(s) known to the EIMC, or, if there is no tag yet generated by the EIMC, to identify objects and features that potentially can be used to generate a new tag(s) and associated file folder(s). The EIMC also can analyze metadata associated with the audio or video content to facilitate identifying objects and features, or other information, in the audio or video file.

At 1306, a tag can be identified based at least in part on the results of the analyzing of the audio or video content. For instance, the EIMC can identify a tag (e.g., in the data store) that matches, or at least substantially matches, an identified object in the audio or video content. As an example, if the EIMC identifies a school bus in video content, and there is a tag for school bus in the data store, the EIMC can identify the tag for school bus in relation to the identified school bus in the video content.

At 1308, the tag can be associated with (e.g., applied, attached, or linked to) the audio or video content. In an aspect, the EIMC can associate the tag with the audio or video content, and further can generate and associate other information relating to the identified object with the audio or video content, wherein the information can include, for example, the temporal location(s) (e.g., moment(s) in time) that the object appears in the audio or video content, details (e.g., features, actions, etc.) regarding the object or other objects or items that are in proximity to the object, or other desired information, in accordance with the predefined document processing criteria. For example, the disclosed subject matter can parse audio or video content (e.g., associated with an electronic document); identify an item of information, comprising an object (e.g., visual object or audio object), in the audio or video content; associate (e.g., link) the tag to the audio or video content based on the object corresponding to the tag; and store the audio or video content in an electronic file folder associated with the tag.

Figure 14:
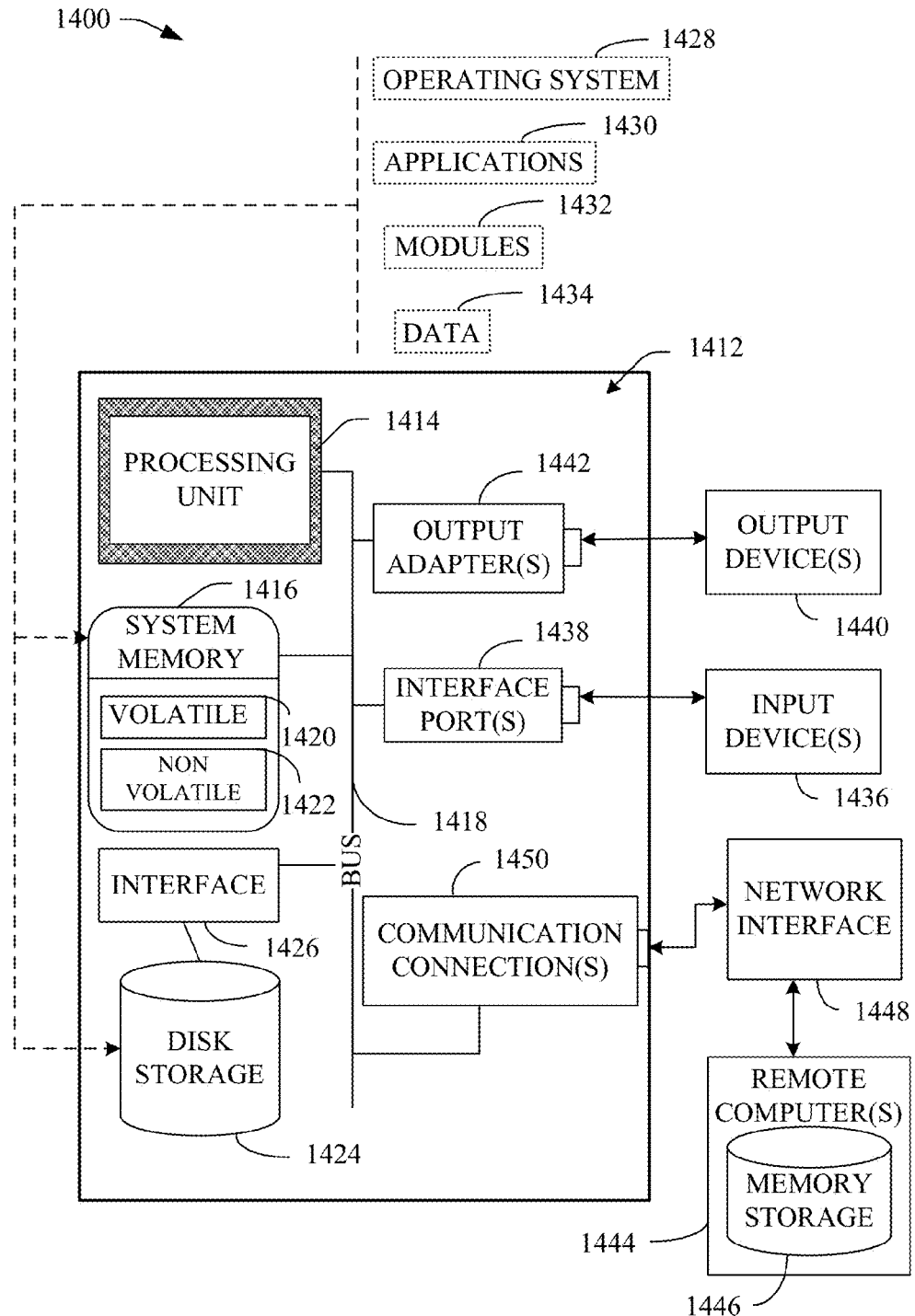
FIG. 14 is a schematic block diagram illustrating a suitable operating environment.
Figure 15:
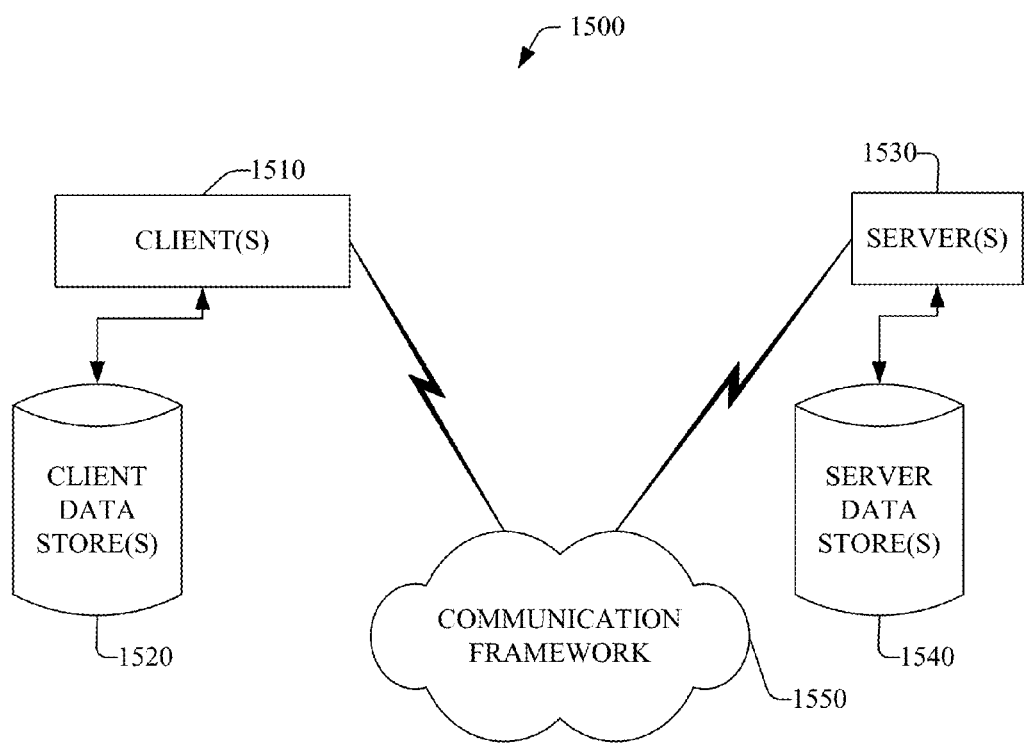
FIG. 15 is a schematic block diagram of a sample-computing environment.

In order to provide a context for the various aspects of the disclosed subject matter, FIGS. 14 and 15 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed subject matter also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 14, a suitable environment 1400 for implementing various aspects of the disclosed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example, a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used, such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

FIG. 15 is a schematic block diagram of a sample-computing environment 1500 with which the subject specification can interact. The system 1500 includes one or more client(s) 1510. The client(s) 1510 can be hardware and/or software (e.g., threads, processes, computing devices). The system 1500 also includes one or more server(s) 1530. Thus, system 1500 can correspond to a two-tier client server model or a multi-tier model (e.g., client, middle tier server, data server), amongst other models. The server(s) 1530 can also be hardware and/or software (e.g., threads, processes, computing devices). The servers 1530 can house threads to perform transformations by employing the disclosed subject matter, for example. One possible communication between a client 1510 and a server 1530 may be in the form of a data packet transmitted between two or more computer processes.

The system 1500 includes a communication framework 1550 that can be employed to facilitate communications between the client(s) 1510 and the server(s) 1530. The client(s) 1510 are operatively connected to one or more client data store(s) 1520 that can be employed to store information local to the client(s) 1510. Similarly, the server(s) 1530 are operatively connected to one or more server data store(s) 1540 that can be employed to store information local to the servers 1530.

It is to be appreciated and understood that components (e.g., communication device, communication network, IMPUI component, IMPC, etc.), as described with regard to a particular system or method, can include the same or similar functionality as respective components (e.g., respectively named components or similarly named components) as described with regard to other systems or methods disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the disclosed subject matter. It is, of course, not possible to describe every conceivable combination of components or methods for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
parsing, by a system comprising a processor, an electronic document;
linking, by the system, a tag to the electronic document displayed via a first device associated with a first user identity based on an item of information associated with the electronic document, wherein the item of information corresponds to the tag;
identifying, by the system, in the electronic document, task-related information relating to a task related to a subject associated with the tag and a date that indicates when the task was completed based on a result of the parsing of the electronic document;
modifying, by the system, an electronic item associated with the tag based on at least a set of information associated with the electronic document, wherein the modifying the electronic item further comprises modifying progress data representing a progress timeline relating to the subject associated with the tag based on at least the set of information, and wherein the modifying the progress data further comprises modifying the progress data representing the progress timeline to indicate that the task was completed on the date based on at least the set of information comprising the task-related information and the date;
determining, by the system, that a second device associated with a second user identity is associated with the tag in response to determining that the second device is a member of a group of devices associated with the tag; and
initiating, by the system, sending at least the set of information to the second device in response to the determining that the second device is associated with the tag.

2. The method of claim 1, further comprising:
identifying, by the system, the set of information associated with the electronic document, wherein the modifying the electronic item comprises instructing that the electronic item associated with the tag is to be modified by the second device based on at least the set of information.

3. The method of claim 2, further comprising:
grouping, by the system, the first device and the second device in the group in connection with the subject associated with the tag, wherein the tag is a private tag and the group is a private group.

4. The method of claim 2, wherein the modifying the electronic item further comprises modifying display of an icon relating to the tag based on at least the set of information.

5. The method of claim 2, further comprising:
searching, by the system, online sites respectively associated with a set of other devices based on the linking of the tag to the electronic document;
identifying, by the system, a second electronic document associated with the online sites based on the second electronic document comprising a second item of information corresponding to the tag;
initiating, by the system, display of a copy of the second electronic document via the first device;
linking, by the system, the tag to the second electronic document based on the second item of information being determined to correspond to the tag; and
storing, by the system, the electronic document and the second electronic document in an electronic file folder associated with the tag.

6. The method of claim 5, further comprising:
propagating, by the system, at least the set of information associated with the electronic document to an online site of the online sites, wherein the online site is associated with the second electronic document; and
modifying, by the system, another set of information associated with the online site based on at least the set of information.

7. The method of claim 1, further comprising:
  searching, by the system, a set of electronic documents in response to the linking of the tag to the electronic document;
  identifying, by the system, a second electronic document of the set of electronic documents based on the second electronic document being determined to comprise a second item of information that corresponds to the tag;
  linking, by the system, the tag to the second electronic document based on the second item of information being determined to correspond to the tag; and
  storing, by the system, the first electronic document and the second electronic document in an electronic file folder associated with the tag.

8. The method of claim 1, further comprising:
  identifying, by the system, a set of items of information, comprising the item of information, in the electronic document;
  comparing, by the system, the set of items of information to a set of tags, comprising the tag; and
  determining, by the system, that the tag corresponds to the item of information in response to the tag being determined to be at least substantially same as the item of information according to a defined similarity criterion.

9. A system, comprising:
  a processor; and
  a memory that stores executable instructions that, when executed by the processor, facilitate performance of operations, comprising:
    storing a set of tags, wherein the set of tags comprises a tag associated with a subject;
    parsing an electronic document;
    associating the tag with the electronic document to be presented via a first communication device associated with a first user identity based on identification of an item of information that is associated with the electronic document and corresponds to the subject;
    identifying, in the electronic document, task-related information relating to a task related to the subject and a date that indicates when the task was completed based on a result of the parsing of the electronic document;
    modifying an electronic item associated with the tag based on a set of information relating to the electronic document, wherein the modifying the electronic item further comprises modifying summary data representing a progress summary relating to the subject associated with the tag based on at least the set of information, and wherein the modifying the summary data further comprises modifying the summary data representing the progress summary to indicate that the task was completed on the date based on at least the set of information comprising the task-related information and the date;
    determining that a second communication device associated with a second user identity is associated with the tag based on the second communication device being determined to be a member of a group of communication devices associated with the tag; and
    propagating the set of information to the second communication device in response to the determining that the second communication device is associated with the tag.

10. The system of claim 9, wherein the parsing the electronic document further comprises:
  parsing the electronic document to identify a set of items of information, comprising the item of information, wherein the set of items of information at least potentially corresponds to the tag.

11. The system of claim 9, wherein the operations further comprise:
  initiating presentation of the electronic document via the first communication device; and
  receiving input to select the item of information to facilitate the associating of the tag with the electronic document.

12. The system of claim 9, wherein the operations further comprise:
  identifying the set of information associated with the electronic document, wherein the modifying the electronic item further comprises initiating an instruction to modify the electronic item associated with the tag by the second communication device based on the set of information.

13. The system of claim 9, wherein the operations further comprise:
  searching online sites respectively associated with a set of other communication devices in response to the associating the tag with the electronic document;
  determining that a second electronic document associated with an online site of the online sites is to be associated with the tag based on the second electronic document being determined to comprise a second item of information that corresponds to the tag;
  retrieving a copy of the second electronic document for transmission to the first communication device;
  associating the tag with the second electronic document based on the second item of information having been determined to correspond to the tag; and
  storing the electronic document and the second electronic document to a storage location associated with the tag.

14. The system of claim 13, wherein the operations further comprise:
  propagating the set of information associated with the electronic document to the online site of the online sites, wherein the online site is associated with the second communication device; and
  modifying another set of information associated with the online site based on the set of information.

15. The system of claim 9, wherein the operations further comprise:
  identifying a set of items of information, comprising the item of information, in the electronic document;
  evaluating the set of items of information with respect to a set of tags, comprising the tag; and
  identifying the tag as corresponding to the item of information in response to determining that the tag and the item of information at least substantially match each other based on a result of the evaluating.

16. The system of claim 9, wherein the operations further comprise:
  sensing a set of items of information in media content associated with the electronic document;
  parsing the set of items of information sensed from the media content;
  identifying the item of information, comprising an object, from the set of items of information,
  associating the tag with the media content based on the object corresponding to the tag; and
  storing the media content in an electronic file folder associated with the tag.

17. The system of claim 9, wherein the operations further comprise:
- identifying a scheduled meeting relating to the subject;
- determining a set of electronic documents, comprising the electronic document, associated with the tag to be relevant to the scheduled meeting;
- retrieving the set of electronic documents; and
- transmitting the set of electronic documents to the second communication device associated with a group of communication devices.

18. A non-transitory computer readable storage medium storing executable instructions that, in response to execution, cause a system comprising a processor to perform operations, comprising;
- parsing an electronic document;
- linking a tag to the electronic document being presented on a first communication device associated with a first user identity based on an item of information associated with the electronic document, wherein the item of information corresponds to the tag;
- identifying, by the system, in the electronic document, task-related information relating to a task related to a subject associated with the tag and a date that indicates when the task was completed based on a result of the parsing of the electronic document;
- modifying an electronic item associated with the tag based on a set of information associated with the electronic document, wherein the modifying the electronic item further comprises modifying progress data representing a progress timeline relating to a subject associated with the tag based on at least the set of information, and wherein the modifying the progress data further comprises modifying the progress data representing the progress timeline to indicate that the task was completed on the date based on at least the set of information comprising the task-related information and the date;
- determining that a second communication device associated with a second user identity is associated with the tag in response to determining that the second communication device is a member of a group of communication devices associated with the tag; and
- propagating at least the set of information to the second communication device in response to the determining that the second communication device is associated with the tag.

19. The non-transitory computer readable storage medium of claim 18, wherein the operations further comprise:
- identifying a set of items of information, comprising the item of information, in the electronic document;
- comparing the set of items of information to a set of tags, comprising the tag; and
- determining that the tag corresponds to the item of information in response to the tag being determined to be at least substantially same as the item of information based on a defined similarity criterion.

20. The non-transitory computer readable storage medium of claim 18, wherein the operations further comprise:
- searching online sites respectively associated with a set of other communication devices based on the linking of the tag to the electronic document;
- identifying a second electronic document associated with the online sites based on the second electronic document comprising a second item of information corresponding to the tag;
- initiating presentation of a copy of the second electronic document via the first communication device;
- linking the tag to the second electronic document based on the second item of information being determined to correspond to the tag; and
- storing the electronic document and the second electronic document in an electronic file folder associated with the tag.

* * * * *